US008743809B2

(12) United States Patent
Vashi et al.

(10) Patent No.: US 8,743,809 B2
(45) Date of Patent: Jun. 3, 2014

(54) CHANNEL SELECTION IN A MULTIPLE CARRIER MULTIPLE RADIO ACCESS TECHNOLOGY NETWORK

(75) Inventors: Prashant H. Vashi, Sunnyvale, CA (US); Vikram Bhaskara Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 13/348,323

(22) Filed: Jan. 11, 2012

(65) Prior Publication Data
US 2013/0089039 A1 Apr. 11, 2013

Related U.S. Application Data

(60) Provisional application No. 61/545,038, filed on Oct. 7, 2011.

(51) Int. Cl.
H04W 4/00 (2009.01)
H04B 7/208 (2006.01)
H04J 3/16 (2006.01)
H04J 3/22 (2006.01)

(52) U.S. Cl.
USPC ............................ 370/329; 370/344; 370/480

(58) Field of Classification Search
USPC ........................... 370/328, 329, 343, 344, 480
See application file for complete search history.

(56) References Cited

U.S. PATENT DOCUMENTS

| 7,769,382 | B2 | 8/2010 | Rasanen |
| 8,032,139 | B2 | 10/2011 | Oommen et al. |
| 2004/0204035 | A1 | 10/2004 | Sharada et al. |
| 2008/0182615 | A1 | 7/2008 | Xue et al. |
| 2008/0220772 | A1 | 9/2008 | Islam et al. |
| 2010/0144307 | A1 | 6/2010 | Wu |
| 2010/0151877 | A1 | 6/2010 | Lee et al. |
| 2010/0240372 | A1 | 9/2010 | Wu |
| 2011/0003590 | A1 | 1/2011 | Yoon et al. |
| 2011/0028120 | A1 | 2/2011 | Wu |
| 2011/0092207 | A1* | 4/2011 | Motohashi et al. ........ 455/435.1 |

OTHER PUBLICATIONS

3GPP TS 36.331 V8.15.0, Sep. 2011, <URL=http://www.3gpp.org/ftp/Specs/html>info/36331.htm>, pp. 31-36, 46, 50-58, 93 and 96.
PCT/US2012/058504—International Search Report and Written Opinion mailed Mar. 29, 2013.

* cited by examiner

*Primary Examiner* — Ronald Abelson
(74) *Attorney, Agent, or Firm* — Womble Carlyle Sandridge & Rice LLP

(57) ABSTRACT

Methods and apparatuses to adaptively select radio frequency channels with which to connect a mobile wireless device to a wireless network are described. In response to a trigger event, the mobile wireless device selects a radio frequency channel from a list of radio frequency channels that use a first radio access technology and transmits a series of connection requests on the selected radio frequency channel. When no acknowledgement is received, the mobile wireless device excludes the selected radio frequency channel from the list of radio frequency channels and repeats the selecting, transmitting and excluding steps up to a maximum number of repetitions before attempting to connect to the wireless network using a second radio access technology.

20 Claims, 16 Drawing Sheets

CHANNEL SELECTION IN A MULTIPLE CARRIER MULTIPLE RADIO ACCESS TECHNOLOGY NETWORK

CROSS REFERENCE TO RELATED APPLICATIONS

This U.S. patent application claims the benefit of U.S. Provisional Application No. 61/545,038, filed Oct. 7, 2011 and entitled "CHANNEL SELECTION IN A MULTIPLE CARRIER MULTIPLE RADIO ACCESS TECHNOLOGY NETWORK" by Yerrabommanahalli et al, and which is incorporated by reference herein in its entirety for all purposes.

TECHNICAL FIELD

The described embodiments generally relate to methods and apparatuses for adaptive channel selection for mobile wireless devices. More particularly, the present embodiments describe selecting channels from an adaptively changing channel list for mobile wireless devices during connection establishment.

BACKGROUND

Wireless networks continue to evolve as new communication technologies develop and standardize. Current wireless network deployments include many variations in architecture, including support for different wireless communication technologies offered by one or more wireless network service providers. A representative wireless network for a wireless network service provider can include support for one or more releases of wireless communication protocols specified by the Third Generation Partnership Project (3GPP) and Third Generation Partnership Project 2 (3GPP2) communication standards organizations. The 3GPP develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops mobile communication standards that include CDMA2000 1xRTT and 1xEV-DO standards. Each of the standards listed include an idle state, in which a mobile wireless device can be associated with but not connected to a wireless network, and a connected state, in which the mobile wireless device can be connected to and actively transmitting and receiving data with the wireless network. In order to transition from the idle state to the connected state, a connection establishment routine can be executed by the mobile wireless device through which a radio frequency channel having appropriate characteristics for communication with an access portion of the wireless network can be selected. The mobile wireless device can select the radio frequency channel from a set of radio frequency channels broadcast by the wireless network.

Just as wireless networks can support several versions of a communication protocol and/or different wireless communication protocols, mobile wireless devices can include support for connecting to one or more wireless networks that use one or more different wireless communication protocols. Each wireless communication protocol can provide a different set of capabilities, such as features, data rates, power requirements and service coverage area. The mobile wireless device can be configured to select among the different wireless communication protocols when associating with and connecting to a wireless network. When a connection cannot be established with the wireless network using a selected radio frequency channel that supports a particular wireless communication protocol, the mobile wireless device can switch to attempting a connection on a different radio frequency channel using a different wireless communication protocol. The latter wireless communication protocol, however, can provide a different and more limited set of capabilities than the first attempted wireless communication protocol, which can affect data throughput, power consumption or other key factors that affect a user experience. Thus, there exists a need to select radio frequency channels adaptively when establishing connections to a wireless network from among one or more wireless communication protocols and to balance a set of features realized by the resulting established connection compared with a time required to establish the connection between the mobile wireless device and the wireless network.

SUMMARY OF THE DESCRIBED EMBODIMENTS

In one embodiment, a method of adapting selection of a radio frequency channel to connect a mobile wireless device to a wireless network is described. The method includes at least the following steps. Initially, the mobile wireless device is associated with the wireless network on a first radio frequency channel using a first radio access technology. The mobile wireless device receives a trigger to establish a connection between the mobile wireless device and the wireless network. The mobile wireless device transmits one or more connection requests to the wireless network on the first radio frequency channel. When an acknowledgement is received from the wireless network to the one or more connection requests transmitted to the wireless network on the first radio frequency channel, the mobile wireless device connects to the wireless network on the first radio frequency channel. When no acknowledgement is received from the wireless network to the one or more connection requests transmitted on the first radio frequency channel, the mobile wireless device transmits one or more connection requests to the wireless network on a second radio frequency channel that uses the first radio access technology. When receiving an acknowledgement from the wireless network to the one or more connection requests transmitted on the second radio frequency channel, the mobile wireless device connects to the wireless network on the second radio frequency channel. When receiving no acknowledgement from the wireless network to the one or more connection requests transmitted on the first and second radio frequency channels that use the first radio access technology, the mobile wireless device attempts to connect to the wireless network using a second radio access technology. In an embodiment, the first radio frequency channel is selected from a first list of radio frequency channels that use the first radio access technology. In an embodiment, the first radio access technology supports connections having higher transmission rates than the second radio access technology.

In another embodiment, a method of adapting radio frequency channel selection to connect a mobile wireless device to a wireless network is described. The method includes at least the following steps. The mobile wireless device receives a trigger to establish a connection with the wireless network. The mobile wireless device selects a radio frequency channel from a list of radio frequency channels that use a first radio access technology. The mobile wireless device transmits a series of connection requests on the selected radio frequency channel using the first radio access technology to the wireless network. When receiving no acknowledgement to the series of connection requests on the selected radio frequency channel, the mobile wireless device excludes the selected radio frequency channel from the list of radio frequency channels. The mobile wireless device then repeats the selecting, transmitting and excluding up to a maximum number of repetitions. When no acknowledgement is received by the mobile wireless device to connection requests transmitted on any of the selected radio frequency channels that use the first radio access technology, the mobile wireless device attempts to connect to the wireless network by transmitting on one or more radio frequency channels that use a second radio access technology.

In a further embodiment, a mobile wireless device associated with a wireless network on a first radio frequency channel that uses a first radio access technology is described. The mobile wireless device includes an application processor and a transceiver. The application processor is configured to control establishing and releasing connections for application services in the mobile wireless device. The transceiver is configured to transmit signals to and receive signals from the wireless network according to wireless communication protocols. The transceiver is further configured to transmit up to a maximum number of connection requests to the wireless network on the first radio frequency channel. The transceiver is also configured to transmit one or more connection requests on one or more alternate radio frequency channels that use the first radio access technology when receiving no acknowledgement from the wireless network to any of the connection requests transmitted on the first radio frequency channel. The transceiver is further configured to transmit one or more connection request using a second radio access technology when receiving no acknowledgement from the wireless network to any of the connection requests transmitted on the radio frequency channels that use the first radio access technology.

In yet another embodiment, a computer program product encoded in a non-transitory computer readable medium for adapting radio frequency channel selection to connect a mobile wireless device with a wireless network is described. The computer program product includes at least the following computer program code. Computer program code for creating a list of radio frequency channels that use a first radio access technology. Computer program code for selecting a radio frequency channel from the created list of radio frequency channels that use the first radio access technology. Computer program code for transmitting a series of connection requests on the selected radio frequency channel to the wireless network. Computer program code for repeating the creating, selecting and transmitting until receiving an acknowledgement from the wireless network or until after transmitting on a set maximum number of different radio frequency channels that use the first radio access technology. Each successively created list of radio frequency channels excludes previously selected radio frequency channels that use the first radio access technology.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
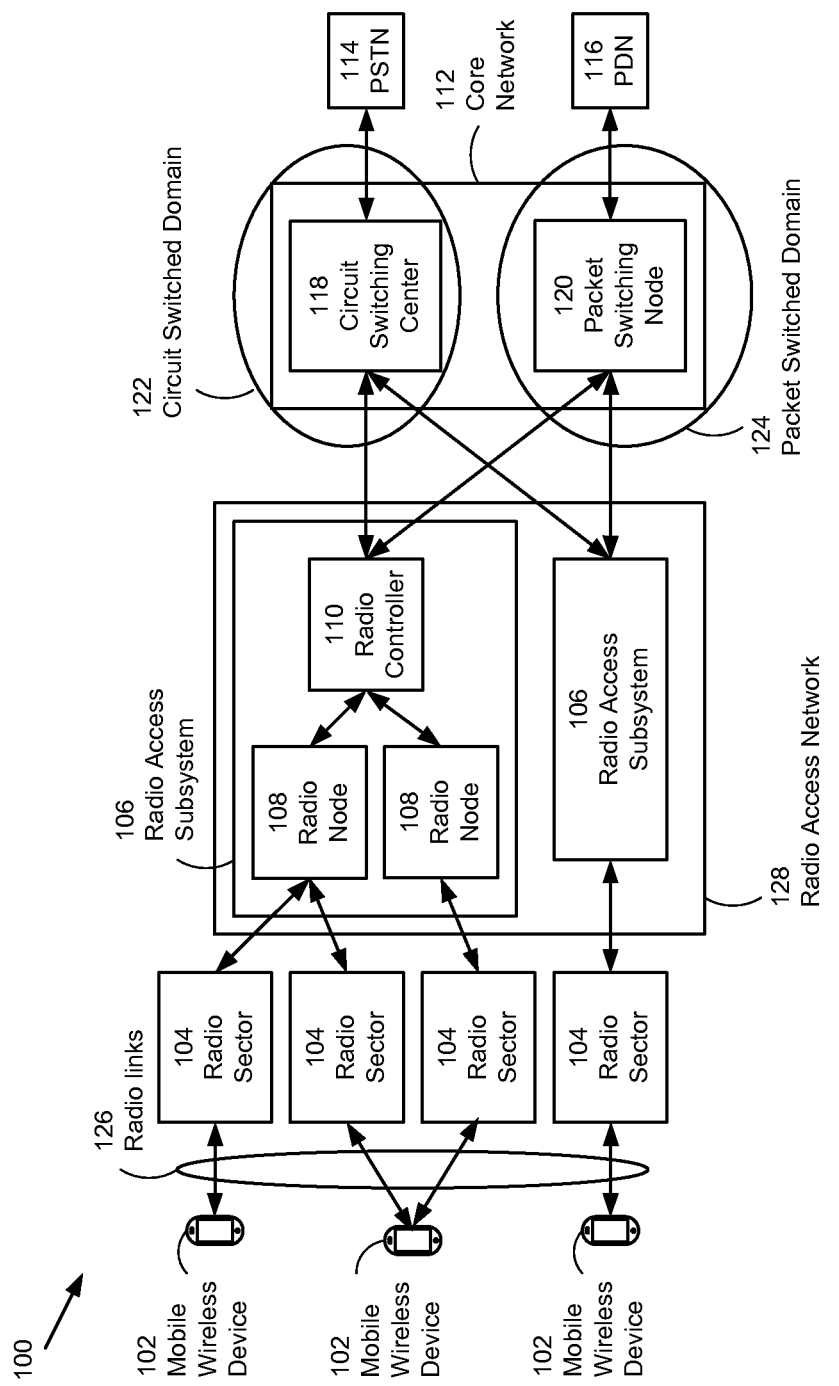
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for adapting channel selection when establishing a connection between a mobile wireless device and a wireless network. In particular, the mobile wireless device can be configured to trade off a time to establish a connection and one or more capabilities offered by difference wireless communication protocols that can be supported by the mobile wireless device. The mobile wireless device can seek to establish a connection using a default wireless communication protocol that has a preferred set of capabilities by trying multiple radio frequency channels before switching to a less preferred wireless communication protocol. It should be understood that implementations of the same methods and apparatuses described herein can apply to mobile wireless devices used in different types of wireless networks, particularly wireless networks that offer connections using two or more different generations of wireless communication protocols. For example, the same teachings can be applied to a GSM/UMTS network, an LTE/UMTS network, an LTE/CDMA2000 network or other "combined" multiple radio access technology (multi-RAT) wireless networks. In general, the teachings described herein can apply to a mobile wireless device operating in a wireless network based on one or more different radio access technologies. The specific examples and implementations described herein are presented for simplicity in relation to CDMA2000 1xRTT and 1xEv-DO networks but can also apply to other wireless network environments.

Mobile wireless devices can offer advanced communication capabilities, including increased data transfer speeds, access to multiple types of wireless networks and robust performance in the presence of varying levels of noise and interference. At the same time, manufacturers of a mobile wireless device can seek to improve "stand-by" time of the mobile wireless device to minimize power consumed from limited battery storage available within the mobile wireless device. Thus, a balance between robust performance and power consumption can be sought. To improve data throughput, the mobile wireless device can support one or more recent generation wireless communication protocols that can offer substantially increased data speeds compared with previous generation wireless communication protocols. For example, CDMA2000 1xRTT offers a peak data rate of only 153 kbps, while CDMA2000 1xEV-DO Rev A and Rev B offer peak data rates of approximately 2-3 Mbps and 5 Mbps respectively. To achieve higher data rates, an improved signal to noise/interference rate (SNIR) can be required and more advanced signal processing algorithms can be used. Received signal strength at a mobile wireless device can decrease rapidly with increasing distance between the mobile wireless device and a radio access subsystem in the wireless network. Achievable data rates for the mobile wireless device can generally decrease with increasing distance between the mobile wireless device and the access system as a result. The geographic coverage area for a given wireless communication protocol can also vary based on wireless network equipment deployment and on a maximum distance from the radio access subsystem that the wireless communication protocol can support. A higher radio frequency channel can attenuate more rapidly than a lower radio frequency channel, and thus a wireless communication protocol that can offer a higher data rate based on higher radio frequency channels can cover a smaller area than a wireless communication protocol that can offer a lower data rate using lower radio frequency channels.

A user of the mobile wireless device can prefer a higher data rate connection when available over a lower data rate connection. The mobile wireless device can determine when establishing a connection with the wireless network when to back down from a later generation (or higher data rate) wireless communication protocol to an earlier generation (or lower data rate) wireless communication protocol. When not connected to the wireless network, the mobile wireless device can be in an "idle" state, i.e. known to the wireless network but not actively transmitting. The mobile wireless device can be "idle" on a particular radio frequency channel. The mobile wireless device can attempt to establish a connection based on an event triggered at the mobile device (such as when a user initiates an internet connection or email retrieval) or based on an event triggered by the wireless network (such as a page to establish a data connection between the wireless network and the mobile wireless device). The mobile wireless device can be configured to establish the connection preferably using a later generation (or higher data rate) wireless communication protocol, initially attempting the "idle" radio frequency channel and subsequently trying one or more other radio frequency channels that use the later generation wireless communication protocol. The number of different radio frequency channels to attempt can be configurable. When no connection can be realized using the different radio frequency channels attempted with the later generation wireless communication protocol, the mobile wireless device can back down to an earlier generation wireless communication protocol to establish a connection, albeit with a reduced feature set and/or reduced data rate. The mobile wireless device can be configured to be biased toward realizing a higher data rate connection or toward a reduced time to establish a connection to the wireless network. The mobile wireless device can also distinguish between establishing a voice connection and a data connection, and the mobile wireless device can select among radio frequency channels and/or wireless communication protocols differently when establishing a voice connection than when establishing a data connection. Similarly, the mobile wireless device can used different procedures when establishing circuit switched connections than when establishing packet switched connections. The mobile wireless device can be configured to attempt fewer radio frequency channels (e.g. only one or two) that use a particular preferred radio access technology (or set of preferred radio access technologies) when establishing a voice connection or a circuit switched connection and can be configured to attempt more radio frequency channels when establishing a data connection or a packet switched connection before switching to a radio frequency channel that uses a less preferred radio access technology.

While the description above outlines choosing between later and earlier generation wireless communication protocols, the mobile wireless device can also choose between two or more different wireless communication protocols or between two or more different generations of a wireless communication protocol based on a number of configurable criteria. Mobile wireless devices that can support two wireless communication protocols based on different underlying wireless communication technology, such as a "world phone" that supports both GSM/UMTS and CDMA2000 1xRTT/EV-DO can choose among all of the wireless communication protocols supported or between one or more subsets of the wireless communication protocols supported based on a configuration of the mobile wireless device. Within a given wireless communication technology, such as CDMA2000, the mobile wireless device can be configured to realize data transfer on the higher speed 1x EV-DO wireless network and to conserve capacity on the lower speed 1x RTT wireless network for voice communication. Embodiments described herein can attempt to establish a data connection using all or a subset of available 1x EV-DO radio frequency channels within a sector of a CDMA2000 1x EV-DO wireless network before performing an IRAT (inter radio access technology) handoff to a CDMA2000 1xRTT wireless technology.

These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Radio sectors 104 can have different geometric shapes depending on a transmission antenna configuration, such as an approximate circle or hexagon radiating outward from an omnidirectional antenna at a centrally placed radio node 108 or a cone shape or a rhomboid shape radiating from a directional antenna at a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126. To form a mobile terminated connection between the mobile wireless device 102 and the radio access network 128, a radio controller 110 in the radio access subsystem 106 can instruct the radio node 108 to transmit a signaling message, such as a page message, to the mobile wireless device 102. In certain networks, the radio controller 110 can also instruct the radio node 108 to transmit a signaling indicator, such as a page indicator bit, in advance of the page message to provide notice to the mobile wireless device 102 of the forthcoming page message. Upon reception of the page message, the mobile wireless device 102 can attempt to establish an active connection with the wireless network 100 by sending a connection request message on a radio frequency channel. (The connection request can be bundled together with other information into a common message and need not be a distinct connection request message alone.) In an embodiment, the radio frequency channel carrying the connection request message from the mobile wireless device 102 to the radio node 108 in the wireless network 100 can be an "idle" radio frequency channel on which the mobile wireless device 102 can be associated with the wireless network 100. As described further herein, when no acknowledgement is received by the mobile wireless device 102 from the wireless network 100 in response to the connection request message, the mobile wireless device 102 can attempt a connection with the wireless network 100 using one or more other radio frequency channels that use the same radio access technology as the original radio frequency channel before switching to a different radio access technology.

In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
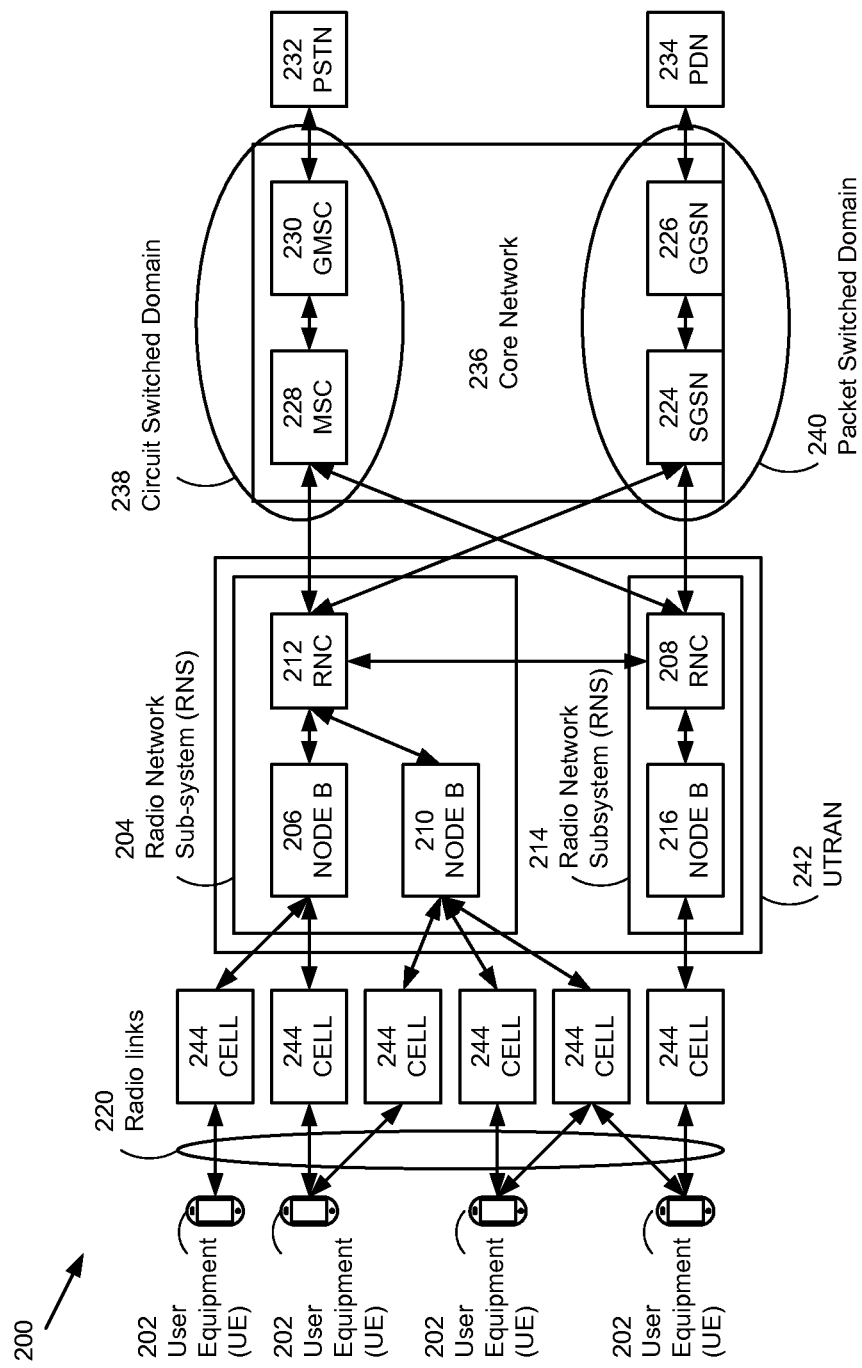
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. In order to establish a connection, the RNC 208/212 can communicate with the UE 202 through an associated Node-B 206/210/216 using a series of signaling messages. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
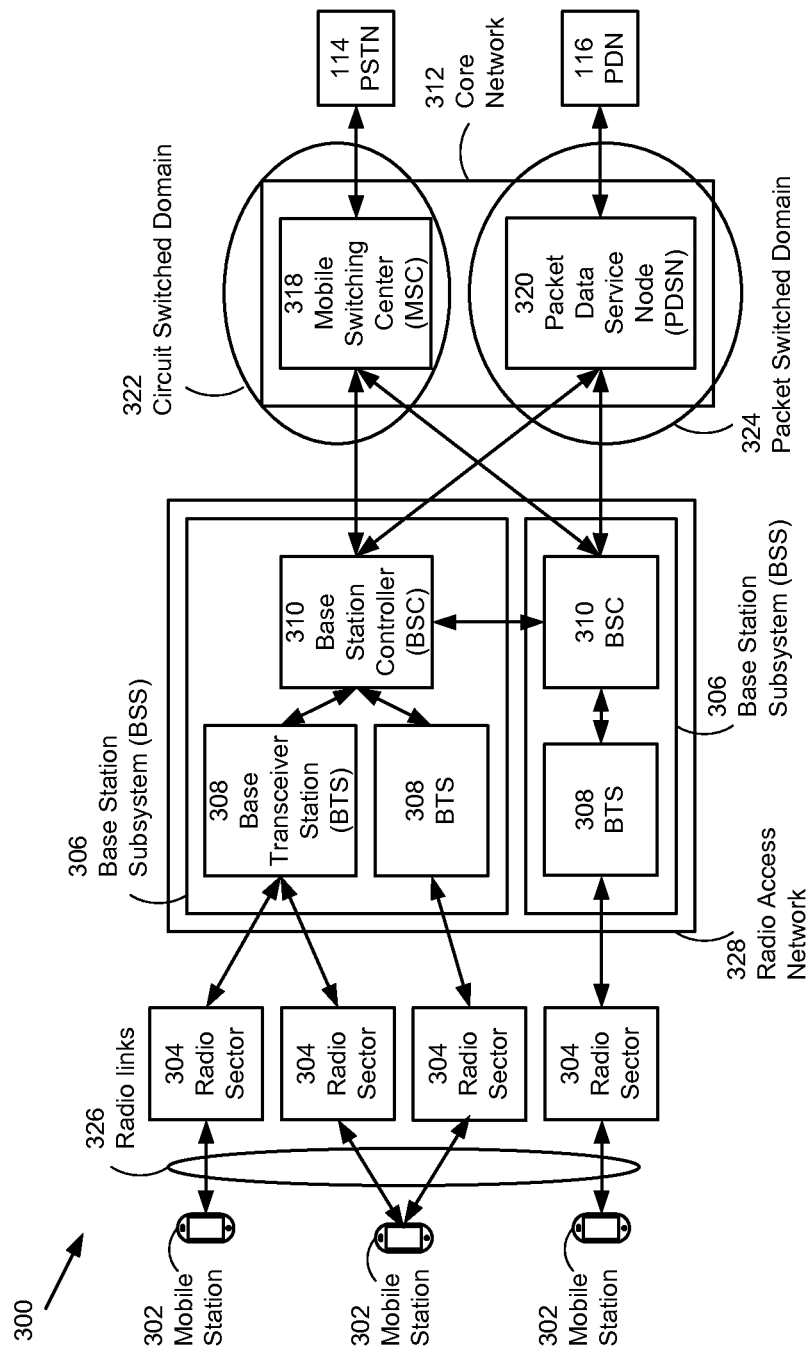
FIG. 3 illustrates components of a CDMA2000 1x (RTT or EV-DO) wireless communication network.

FIG. 3 illustrates a representative CDMA2000 1x wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
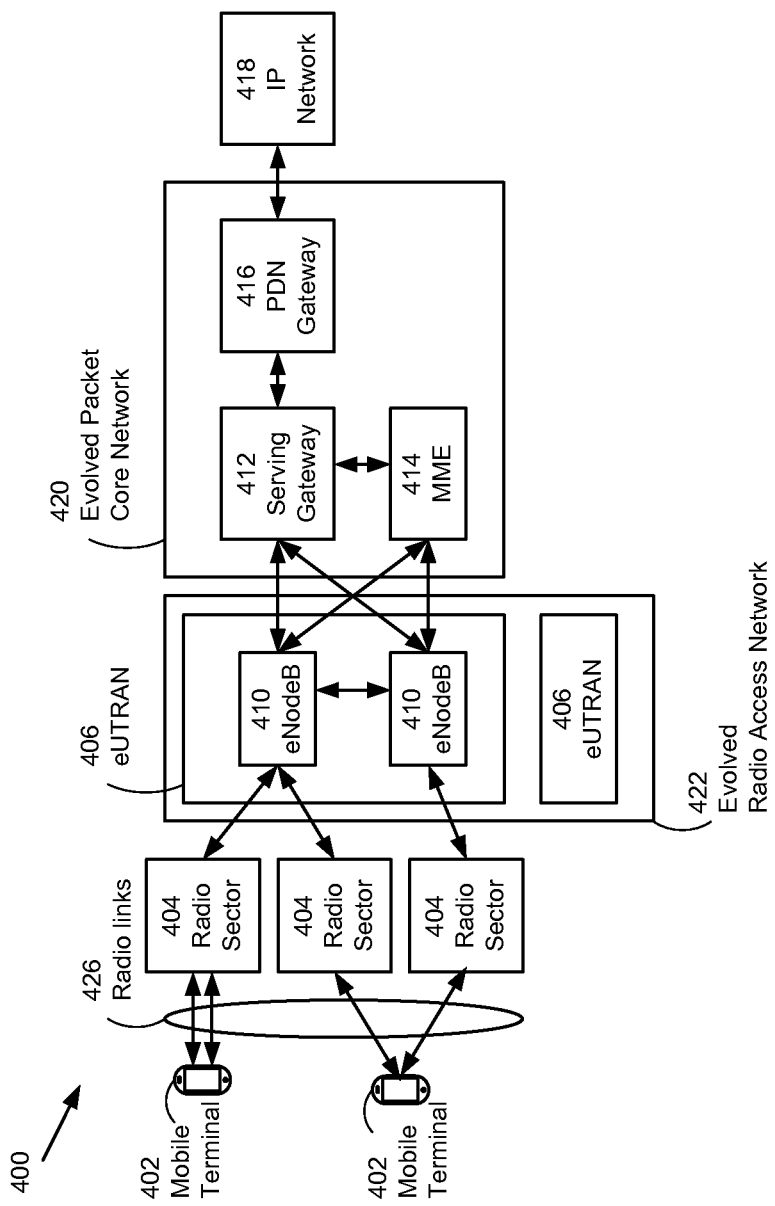
FIG. 4 illustrates components of an LTE (or LTE-Advanced) wireless communication network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 1x network 300) as well as the base station radio controllers (such as the RNC 212 in the UMTS network 200 and the BSC 310 in the CDMA2000 1x network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
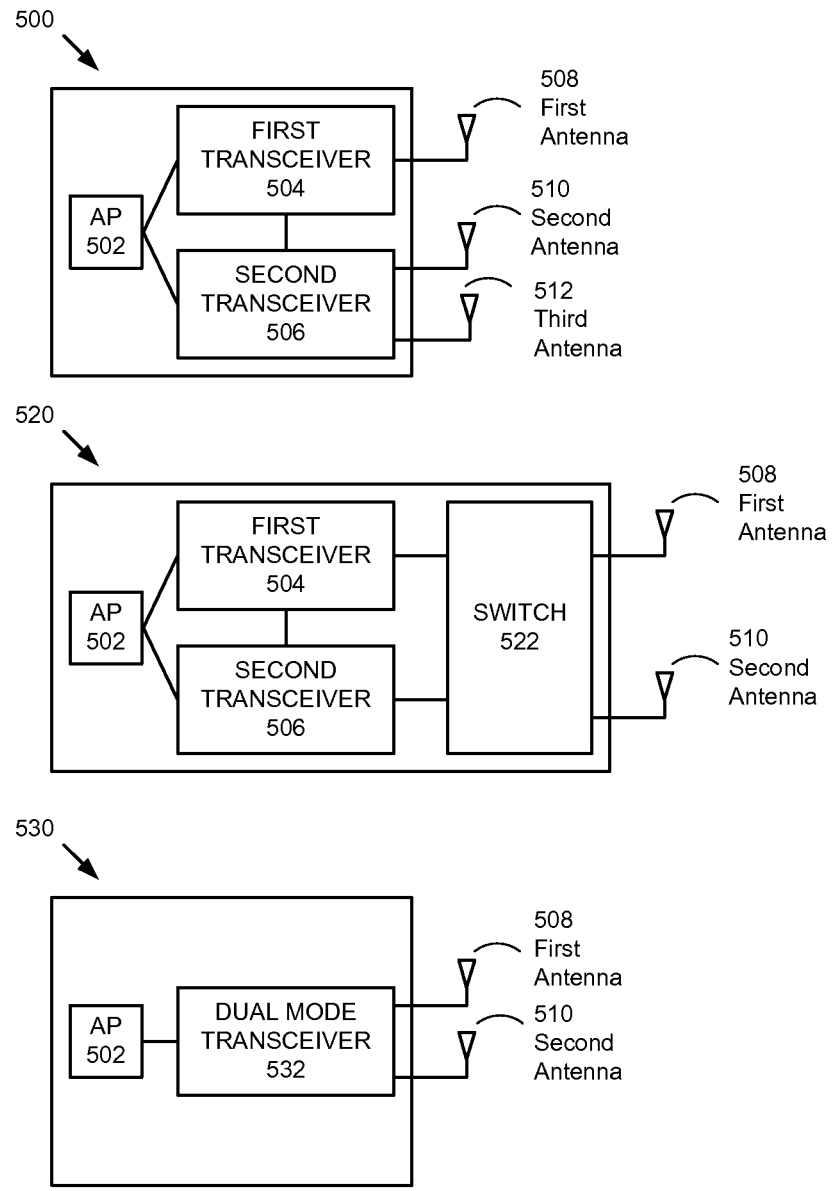
FIG. 5 illustrates several representative architectures for a mobile wireless communication device.

FIG. 5 illustrates select elements for several different architectures that can be used in a mobile wireless device 102. A dual receiver mobile wireless device 500 can include a first transceiver 504 that can process signals according to a first wireless communication protocol and a second transceiver 506 that can process signals according to a second wireless communication protocol. The first transceiver 504 can be interconnected to the second transceiver 506 to provide control information between them enabling coordinated transmission and reception to minimize interference. Both the first transceiver 504 and the second transceiver 506 can be connected to an application processor (AP) 502 that can provide higher layer functions, such as requesting establishment and release of connections for various resident application services. The transceivers 504/506 can provide the lower layer functions that can support the transport of data for the higher layer services ordered by the application processor 502. The first transceiver 504 as shown can be connected to a first antenna 508 that can transmit and receive signals according to the first wireless communication protocol. The second transceiver 506 can be connected to a second antenna 510 and a third antenna 512 that can transmit and receive signals according to a second wireless communication protocol. The use of multiple antennas for certain wireless communication protocols can provide improved performance (e.g. higher data rates or better immunity to interference) compared to a single antenna configuration.

The first and second wireless communication protocols used by the first transceiver 504 and by the second transceiver 506 respectively can be identical or can be different. Circuitry for and capabilities of the first transceiver 504 and the second transceiver 506 can be identical or can be different. In a representative embodiment, the first transceiver 504 can both transmit and receive wireless signals while the second transceiver can only receive but not transmit wireless signals. The application processor 502 can manage establishing and releasing connections between the mobile wireless device 102 and the wireless network 100. Establishment of connections can include reception of signaling messages such as paging messages received through either of the transceivers 504/506 individually or through both transceivers 504/506 simultaneously. The transceivers 504/506 can provide lower layer functions such as reliable bit level transmission and reception that can support the communication of data messages for higher layer services controlled by the application processor 502.

A second dual receiver mobile wireless device 520 illustrates an arrangement to share the first antenna 508 and the second antenna 510 between the first transceiver 504 and the second transceiver 506 through a switching network 522. When the communication protocols for the transceivers 504/506 can require only one antenna each, both transceivers 504/506 can be operated simultaneously with each transceiver 504/506 connected to a single one of the antennas 508/510. When the communication protocol for at least one of the transceivers 504/506 can require both of the antennas 508/510, the second dual receiver mobile wireless device 520 can alternate between transceivers 504/506 for separate connections. The switch 522 can provide the flexibility to connect the antennas 508/510 to one or both of the transceivers 504/506 at any time.

Multiple transceivers 504/506 can require more space and can consume additional power in the mobile wireless device 500/520 than a single transceiver, and a multi-functional single transceiver mobile wireless device 530 can be more compact and more power efficient. The single transceiver mobile wireless device 530 can include a dual mode transceiver 532 connected to the first and second antennas 508/510 and can provide the capability to connect to two different wireless networks individually but not simultaneously, particularly when at least one of the wireless networks can require the use of multiple antennas, such as the LTE communications protocol that mandates the use of at least two receivers in a mobile wireless terminal 402. When connected to the LTE network 400, the dual mode transceiver 532 can use both antennas 508/510 for transmission and reception of signals. Establishing and releasing connections, as well as changing between wireless networks that use different wireless communication radio access technologies can be summarized in several state transition diagrams as follows next.

Figure 6:
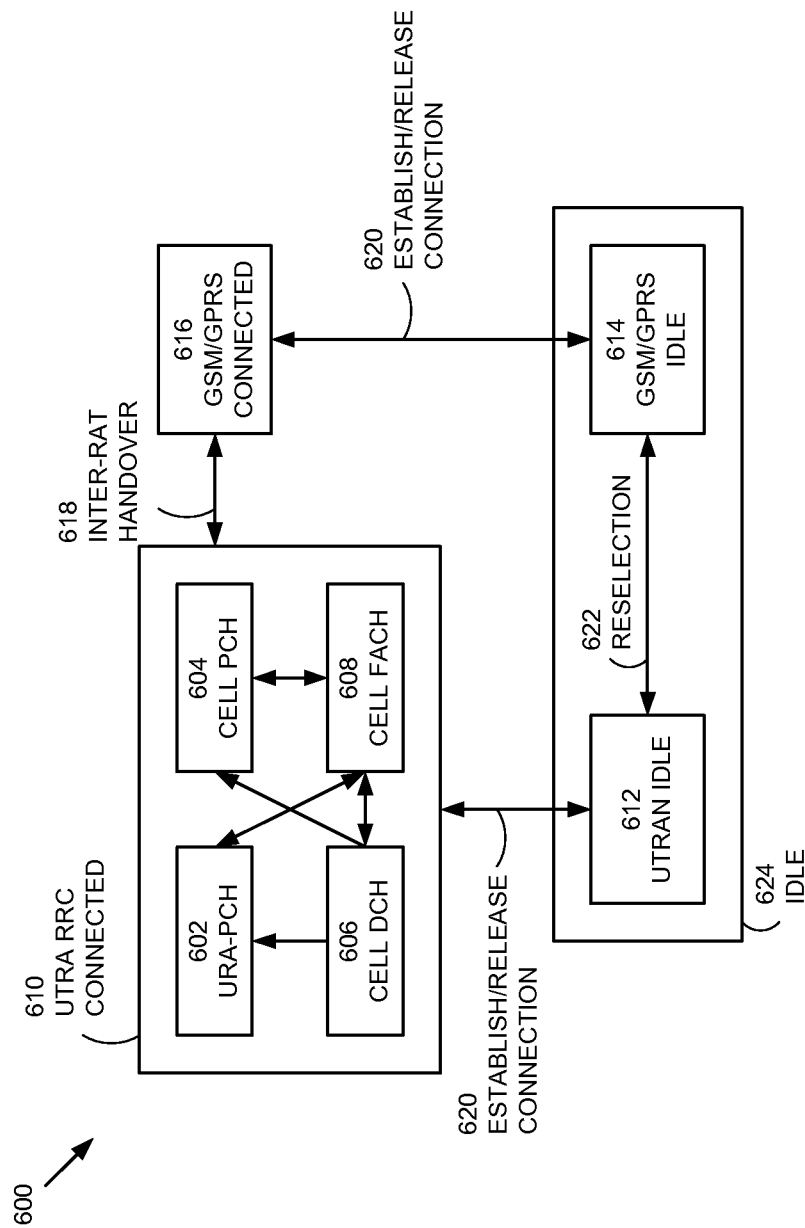
FIG. 6 illustrates a state transition diagram for a mobile wireless device for a UMTS wireless network and a GSM wireless network.

FIG. 6 illustrates a state transition diagram 600 having several states for a radio resource control (RRC) portion of a protocol stack for a UE 202 in a combined UMTS/GSM network. The UE 202 can be in an unconnected IDLE state 624, in a UTRA RRC connected state 610 or in a GSM connected state 616. In IDLE state 624, UE 202 can request an RRC connection to establish radio resources for communication with a wireless network whenever data is available to exchange between UE 202 and the UTRAN 242. Establishing the RRC connection can occur when an application on UE 202 requires a connection to send data or retrieve data from the network, when initiating a mobile voice connection to the wireless network, and when receiving a connection from the wireless network for the UE 202 after receiving a page on a paging channel from the UTRAN 242 or SGSN 224 indicating data available from an external data network. Once UE 202 has sent a request to UTRAN 242 to establish a radio connection, UTRAN 242 can choose a state for the RRC connection. The UTRA RRC connected state can include four separate states, CELL_DCH state 606, CELL_FACH state 608, CELL_PCH state 604 and URA_PCH state 602.

From a "UTRAN idle" state 612 within the IDLE state 624, UE 202 can transition to the CELL_FACH state 608, in which the UE 202 can make an initial data transfer, subsequent to which the wireless network can determine which RRC connected state to use for continued data transfer. The wireless network can move UE 202 into the Cell Dedicated Channel (CELL_DCH) state 606 or keep UE 202 in the Cell Forward Access Channel (CELL_FACH) state 608. In CELL_DCH state 606, a dedicated channel can be allocated to UE 202 for both the uplink and downlink directions to exchange data. The CELL_DCH state 606, with a dedicated physical channel allocated to UE 202, can typically consume more battery power from UE 202 than the other states, and can consume significantly more battery power than the IDLE state 624. Alternatively, rather than place UE 202 in the CELL_DCH state, UTRAN 242 can maintain UE 202 in a CELL_FACH state 608. In a CELL_FACH state 608, no dedicated channel can be allocated to UE 202. Instead, common channels can be used to send signaling in relatively small bursts of data. However, UE 202 can continue to monitor common channels in the CELL_FACH state 608, and therefore the UE 202 can consume more battery power than in select alternative states, namely CELL_PCH state 604 and URA_PCH state 602, as well as compared to IDLE state 624. The UE 202 can transition between the "UTRAN idle" state 612 to the "GSM/GPRS idle" state 614 through a process known as reselection 622. Reselection 622 can include tuning a single transceiver in a mobile wireless device from one frequency to another frequency and also can include using different wireless communication algorithms to transmit and receive radio frequency signals, as different wireless networks can use different wireless communication protocols. The UE 202 can also transition between the UTRA "RRC connected" state 610 to the GSM/GPRS "connected" state 616 through a process referred to as inter-radio access technology (inter-RAT) handover 618. For certain wireless communication protocols, a handover between one wireless network using one wireless communications technology and a second network using a different wireless technology can occur while maintaining an active connection. For other wireless communication protocols, the handover can occur only in an idle state, i.e. active connections cannot be maintained upon handover, which can thus require releasing current connections and establishing new connections (transitions 620). For a single transceiver mobile wireless device, an active connection on a first wireless network can be released, suspended or dropped indirectly (e.g. a non-responsive timeout can occur) when transitioning the transceiver to a second wireless network. When returning to the first wireless network, connections can be re-established. If the two wireless networks permit a seamless transition, an inter-RAT handover 618 between connected states can be possible when sufficient time is allowed for the internal circuitry to transition between different wireless communication technologies.

Figure 7:
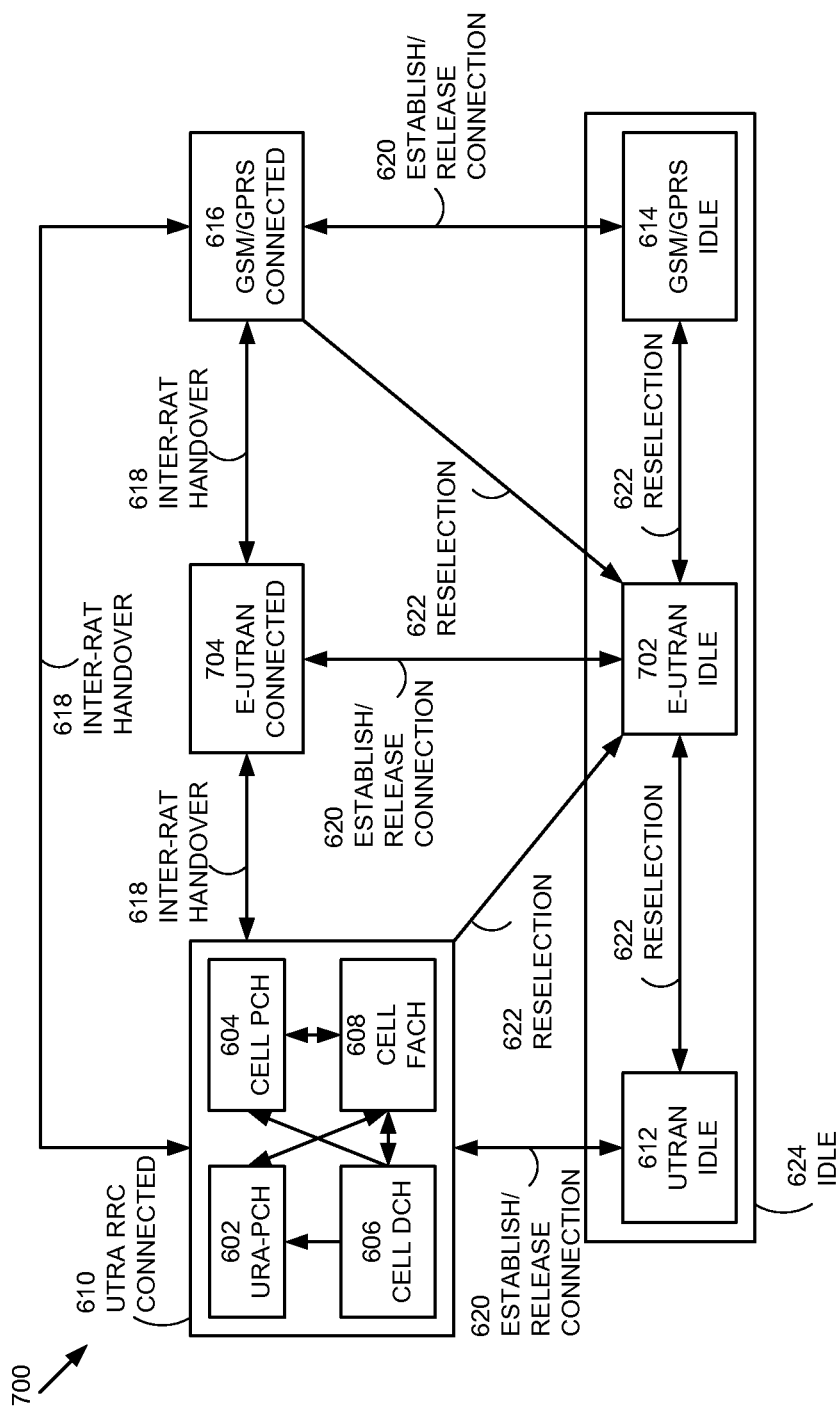
FIG. 7 illustrates a state transition diagram for a mobile wireless device for a UMTS wireless network, an LTE wireless network and a GSM wireless network.

FIG. 7 extends the state transition diagram of FIG. 6 to include states for the LTE network 400. Transitions between an active E-UTRAN connected state 704 and connected states of the GSM/UMTS networks can be accomplished through inter-RAT handovers 618. Transitions between the E-UTRAN connected state 704 and the E-UTRAN idle state 702 can be effected by establishing and releasing connections 620. Transitions between the E-UTRAN idle state 702 and the idle states of the GSM/GPRS/UMTS networks can use reselection 622 processes. In addition to transitions between connected states and between idle states, a mobile wireless device can also transition from a UTRA RRC connected state 610 or a GSM/GPRS connected state 616 to a E-UTRAN idle state 702 by reselection 622. Reselection 622 between the GSM/GPRS connected state 616 and the UTRA RRC connected state 610 can also occur as described for FIG. 6.

Figure 8:
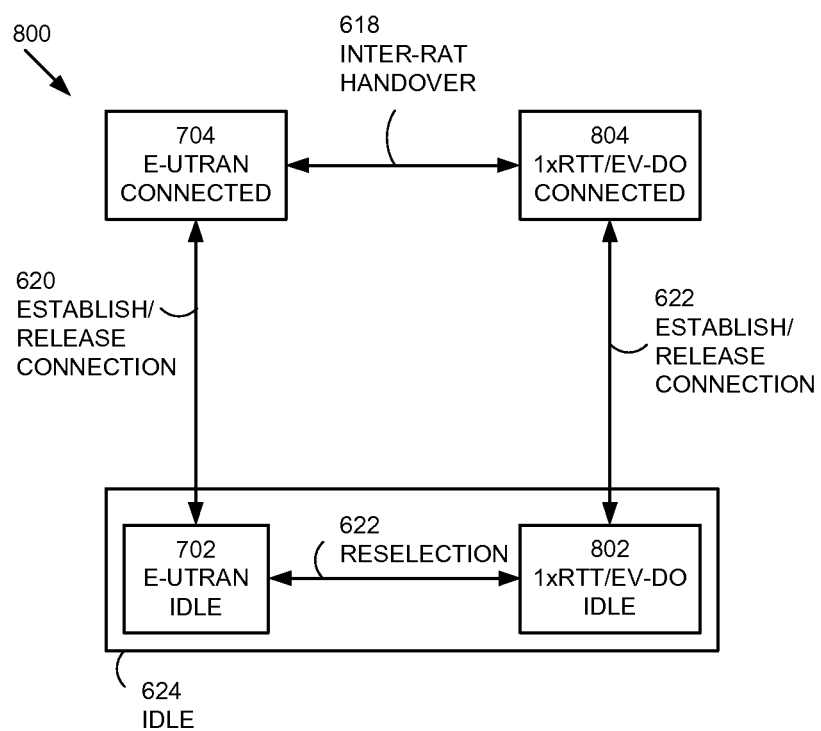
FIG. 8 illustrates a state transition diagram for a mobile wireless device for an LTE wireless network and a CDMA2000 1x wireless network.

FIG. 8 illustrates a state transition diagram between states in an LTE network 400 and a CDMA2000 1x network 300. In the CDMA2000 1x network 300, a mobile wireless device 102 can be in a 1xRTT/EV-DO idle state 802 and can establish and release connections 622 to transition between the /EV-DO idle state 802 and a 1xRTT/EV-DO connected state 804. Transitions between the 1xRTT/EV-DO idle state 802 and the E-UTRAN IDLE state 702 can be effected through a reselection 622 process, while transition between the 1xRTT/EV-DO connected state 804 and the E-UTRAN connected state 704 can be realized using an inter-RAT handover 618 procedure. The inter-RAT handover 618 procedure can allow maintaining a current connection of the mobile wireless device 102 while transitioning between two wireless networks that use two different wireless communication protocols. When establishing a new separate connection using a different wireless communication protocol, a dual transceiver mobile wireless device can use the second transceiver to establish the new connection while retaining a connection to the wireless network through the first transceiver; however, a single transceiver mobile wireless device can only communicate with one network at a time. As such the single transceiver mobile wireless device can transition from a connected state on one wireless network to an idle state (typically by releasing the connection) and then reselecting to the other wireless network before establishing a new connection with the other wireless network.

Figure 9:
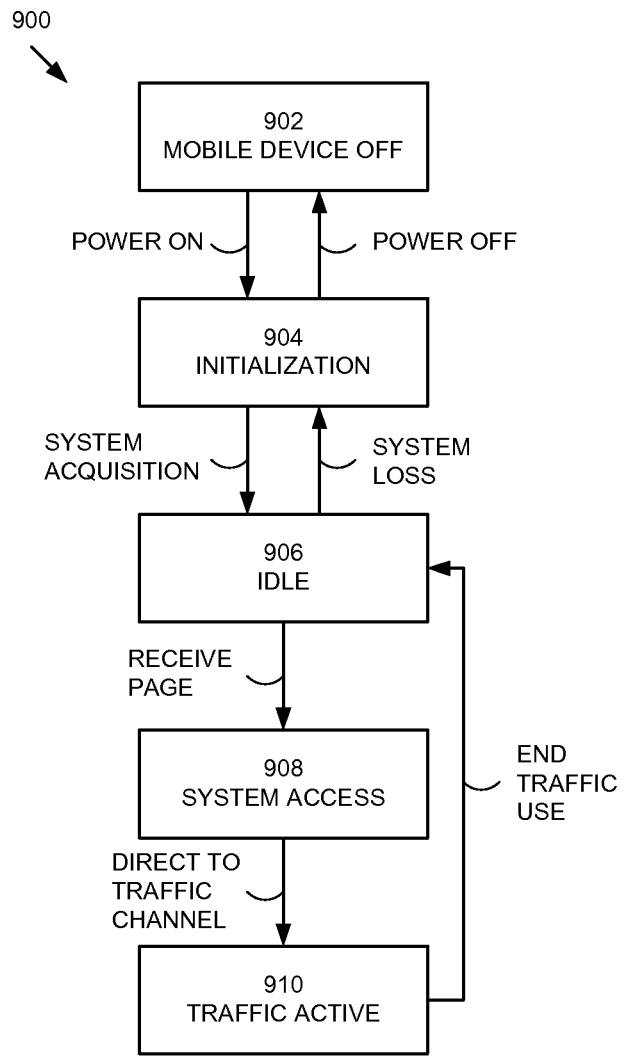
FIG. 9 illustrates a state transition diagram for a mobile wireless device in a wireless network.

FIG. 9 illustrates a high level state transition diagram 900 for the mobile wireless device 102 (and for the mobile station 302 operating in the CDMA2000 1x wireless network 300) when associating and connecting with the wireless network 100. The mobile wireless device 102 can initially be disconnected from the wireless network 100 and can be in a powered off state 902. After powering on, the mobile wireless device 102 can enter an initialization state 904, during which the mobile wireless device 102 can locate one or more radio sectors 104 (or equivalently cells) in the wireless network 100 with which the mobile wireless device 102 can associate and connect. The mobile wireless device 102 can know a frequency band in which to receive transmissions and can identify radio sectors 104 by searching for physical channels, such as pilot signals, broadcast by the wireless network 100. After locating a suitable radio sector 104, the mobile wireless device 102 can register with the wireless network 100 to indicate its presence and thereby alert the wireless network 100 to its availability to initiate and to receive (terminate) connections.

After acquiring the wireless network 100, the mobile wireless device 102 can enter an "idle" state 906. For wireless networks 100 that support power saving modes, the idle state 906 can include periods of time in which portions of the mobile wireless device 102 can be powered down. The mobile wireless device 102 can be powered up during appropriate time intervals known to the wireless network 100 during which the mobile wireless device 102 can receive a page message from the wireless network 100. The page messages can include information broadcast to multiple mobile wireless devices 102 in the wireless network 100 as well as specific messages intended for the particular mobile wireless device 102. After receiving a page message, the mobile wireless device 102 can enter a system access state 608 during which the mobile wireless device 102 can establish radio resources with the wireless network 100 over which to communicate traffic (voice/video/data/messages) with the wireless network 100 in a "traffic active" state 910. The active connection can subsequently be disconnected by the mobile wireless device 102 or by the wireless network 100, and the mobile wireless device 102 can return from the traffic active state 910 to the idle state 906 to await pages for a future connection.

Figure 10:
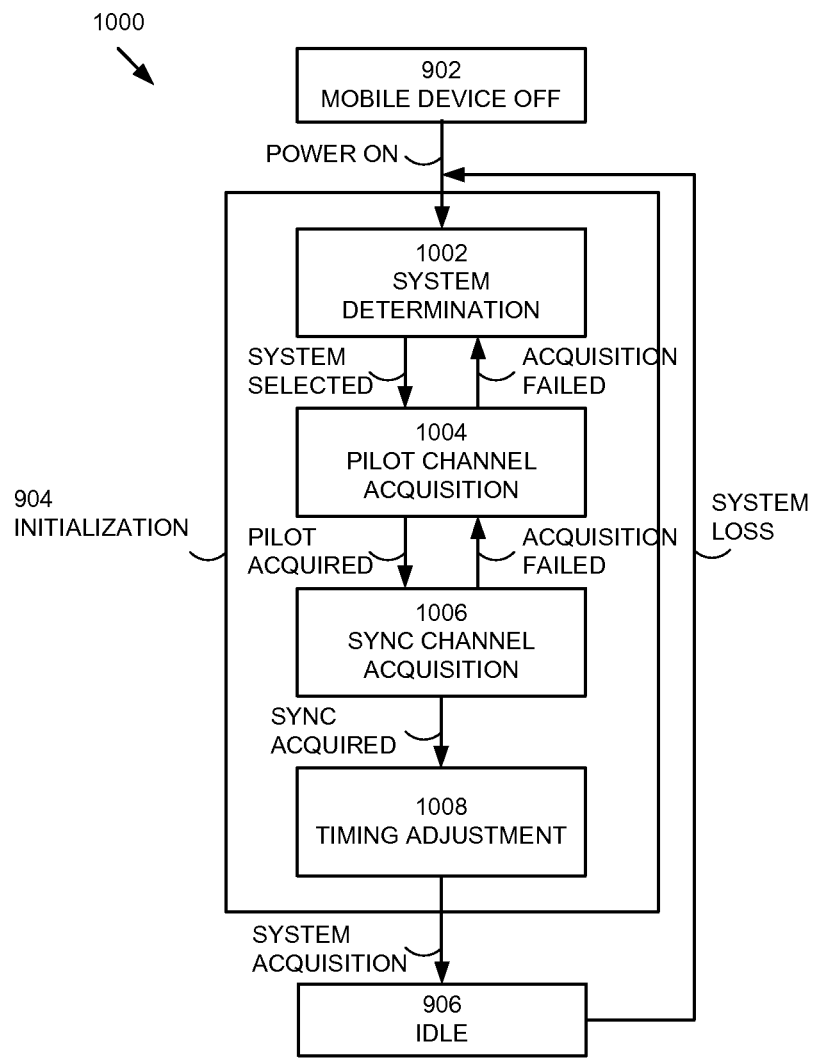
FIG. 10 illustrates a state transition diagram for a mobile wireless device during system acquisition of a wireless network.

FIG. 10 illustrates a set 1000 of sub-states through which the mobile wireless device 102 can traverse when executing the initialization state 904 of FIG. 9. After powering up from the power off state 902, the mobile wireless device 102 can enter the system determination sub-state 1002. In the system determination sub-state 1002, the mobile wireless device 102 can select a wireless network 100 as a wireless system to use. Following the selection of the wireless network 100 system, the mobile wireless device 102 can acquire the selected wireless network 100 system by searching for and acquiring a pilot channel in the pilot channel acquisition sub-state 1004. Once the pilot channel is acquired, the mobile wireless device 102 can enter a sync channel acquisition sub-state 1004. If no pilot channel is acquired by the mobile wireless device 102 within a pre-determined period of time while in the pilot channel acquisition sub-state 1004, the mobile wireless device 102 can return to the system determination sub-state 1002 indicating a pilot acquisition failure. Following successful pilot acquisition, the mobile wireless device 102 can obtain system configuration and timing information from the wireless network 100 in the sync channel acquisition sub-state 1004. Once sync channel acquisition is complete, the mobile wireless device 102 can enter the timing adjustment sub-state 1008 and can synchronize timing in the mobile wireless device 102 with the selected wireless network 100. When system acquisition is complete, the mobile wireless device 102 can enter the idle state 906 and can monitor one or more signaling channels for signaling messages sent by the wireless network 100.

Figure 11:
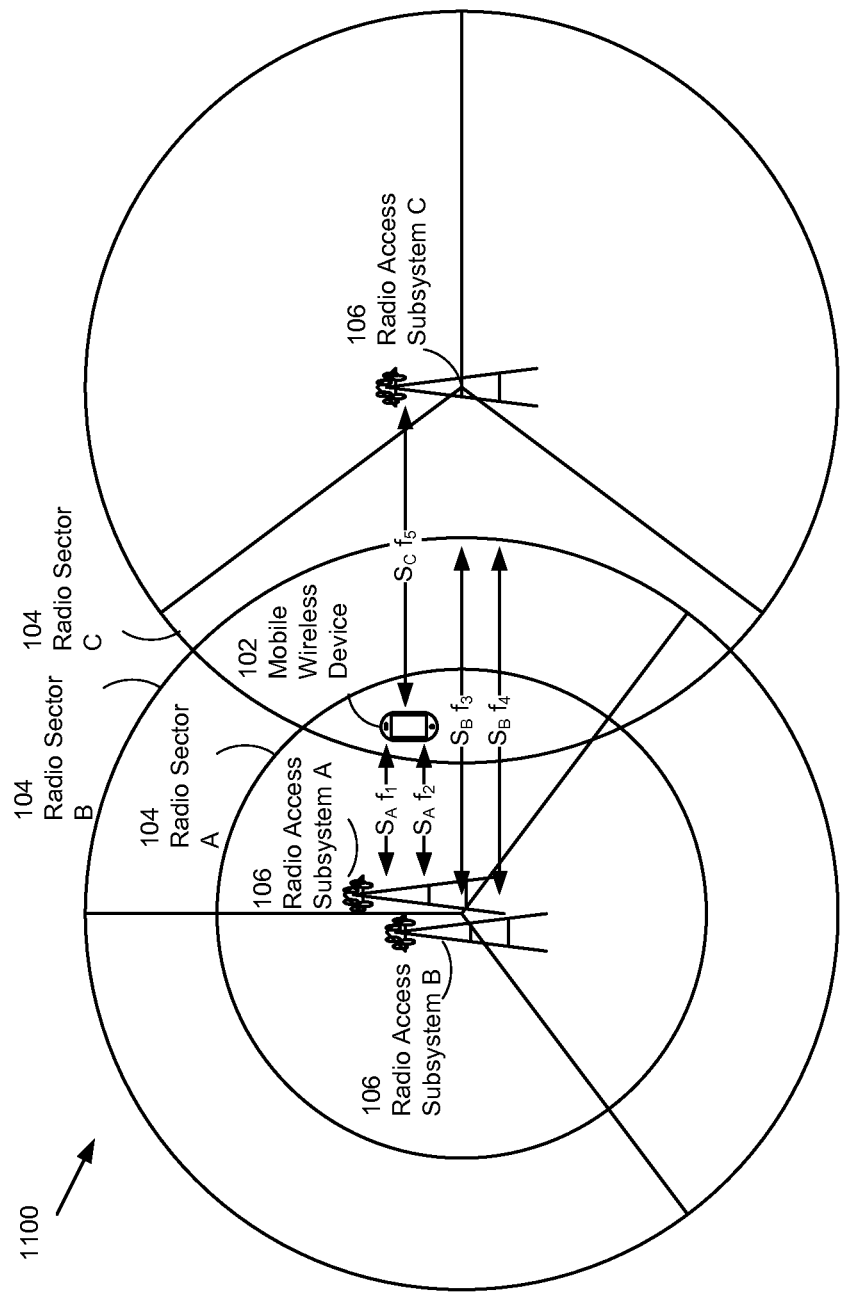
FIG. 11 illustrates a set of radio frequency channels for multiple radio sectors from a wireless network available to the mobile wireless device.

FIG. 11 illustrates the mobile wireless device 102 located at a position where signals can be received from three different radio access subsystems 106 of the wireless network 100. Each radio access subsystem 106 can transmit and receive through radio sectors 104 that can overlap in geographic area covered. Each radio access subsystem 106 can transmit using the same or different wireless communication technologies. One radio sector 104 using one wireless communication technology can overlap substantially with another radio sector 104 offering a different set of capabilities based on a different underlying wireless communication technology. The geographic area covered by a radio sector 104 can depend on the wireless communication technology used. The mobile wireless device 102 can receive signals from multiple radio access subsystems 106, multiple radio sectors 104 and multiple radio frequency channels within each radio sector 104. As illustrated in FIG. 11, the mobile wireless device 102 can be situated within both radio sector A 104 and within radio sector B 104 that can radiate outward from radio access subsystem A 106 and from radio access subsystem B 106 respectively. The mobile wireless device 102 can also be situated within radio sector C 104 that can radiate outward from radio access subsystem C 106. The mobile wireless device 102 can receive signals from each of the radio access subsystems A, B and C 106 simultaneously and can select between the different radio access subsystems A, B and C based on received signal properties (such as received signal strength, received signal code power, received signal to noise/interference ratios or other metrics for received signal quality). The mobile wireless device 102 can also select a wireless network 100 with which to associate and/or connect based on capabilities of the wireless network 100 communicated in messages broadcast by the radio access subsystems 106.

In a representative embodiment, the mobile wireless device 102 can receive multiple radio frequency channels from radio sector A 104, each radio frequency channel centered on a different radio frequency carrier. As indicated in FIG. 11, the radio sector A 104 can use a first radio frequency channel having a radio frequency $f_1$ and also a second radio frequency channel having a radio frequency $f_2$. In a representative embodiment, the geographic coverage area of the radio sector A 104 can be more limited in area than the geographic coverage area of the radio sector B 104. Radio sector A 104 can include a region radiating from radio access subsystem A 106; while radio sector B 104 can include a larger region radiating from radio access subsystem B 106. Radio sector B 104 can include at least two radio frequency channels that can use radio frequencies $f_3$ and $f_4$. For notational convenience, two radio frequency channels for radio sector A 104 can be labeled as "$S_A\ f_1$" and "$S_A\ f_2$", while two radio frequency channels for radio sector B 104 can be labeled as "$S_B\ f_3$" and "$S_B\ f_4$". In a representative embodiment the radio frequency channels "$S_A\ f_1$" and "$S_A\ f_2$" for radio sector A 104 can support a set of preferred capabilities, such as downlink and/or uplink transmissions at higher data rates than offered by the radio frequency channels "$S_B\ f_3$" and "$S_B\ f_4$" used for radio sector B 104. The mobile wireless device 102 can be associated with the radio access subsystem A 106 through one of the radio frequency channels "$S_A\ f_1$" and "$S_A\ f_2$" and can prefer to connect to the wireless network 100 through radio access subsystem A 106 using the radio frequency channels "$S_A\ f_1$" and "$S_A\ f_2$" rather than through the less capable radio frequency channels "$S_B\ f_3$" and "$S_B\ f_4$" for radio sector B 104 radiating from radio access subsystem B 106. As described further herein, the mobile wireless device 102 can default to attempting a connection first on the radio frequency channel with which the mobile wireless device 102 can be associated with the wireless network 100 in the idle state. When unsuccessful using the idle radio frequency channel, the mobile wireless device 102 can attempt a connection on another radio frequency channel having comparable capabilities and in the same radio sector A 104 before "backing down" to using less preferred, lower capability radio frequency channels, such as "$S_B\ f_3$" and "$S_B\ f_4$" for radio sector B 104.

In a representative embodiment, the mobile wireless device 102 can also receive signals from the radio access subsystem C 106 through one or more radio frequency channels including a radio frequency channel "$S_C\ f_5$" as shown in FIG. 11. When the radio sector C 104 uses the same preferred wireless communication technology protocol as radio sector A 104, the mobile wireless device 102 can be configured to attempt to connect to the wireless network 100 through radio access subsystem A 106 first (if associated with the wireless network 100 through the radio access subsystem A 106) followed by attempting to connect through radio sector C 104 of radio access subsystem C 106 before handing down to a less preferred wireless communication technology protocol used by radio access subsystem B 106. Thus, the mobile wireless device 102 can select among multiple radio access subsystems 106 that offer a preferred wireless communication technology protocol and need not only connect through a single radio access subsystem 106. In a representative embodiment, the preferred wireless communication technology protocol can be a later version of a given wireless communication protocol, such as a Revision A CDMA2000 1x EV-DO protocol, which can be preferred over a less capable earlier version, such as a Revision 0 CDMA2000 EV-DO protocol. In another representative embodiment, the preferred wireless communication technology protocol can be a more advanced wireless communication protocol, such as a version of a CDMA2000 1x EV-DO protocol, over a less preferred, less advanced wireless communication protocol, such as a CDMA2000 1xRTT protocol. The mobile wireless device 102 can contain an ordered preference list of supported protocols. The ordered preference list can be pre-configured and/or software configurable by the user or by an administrator. When firmware within the mobile wireless device 102 is updated, the ordered preference list can be updated. The ordered preference list can also be dynamically updated based on a set of radio frequency signals received and monitored by the mobile wireless device 102.

Figure 12:
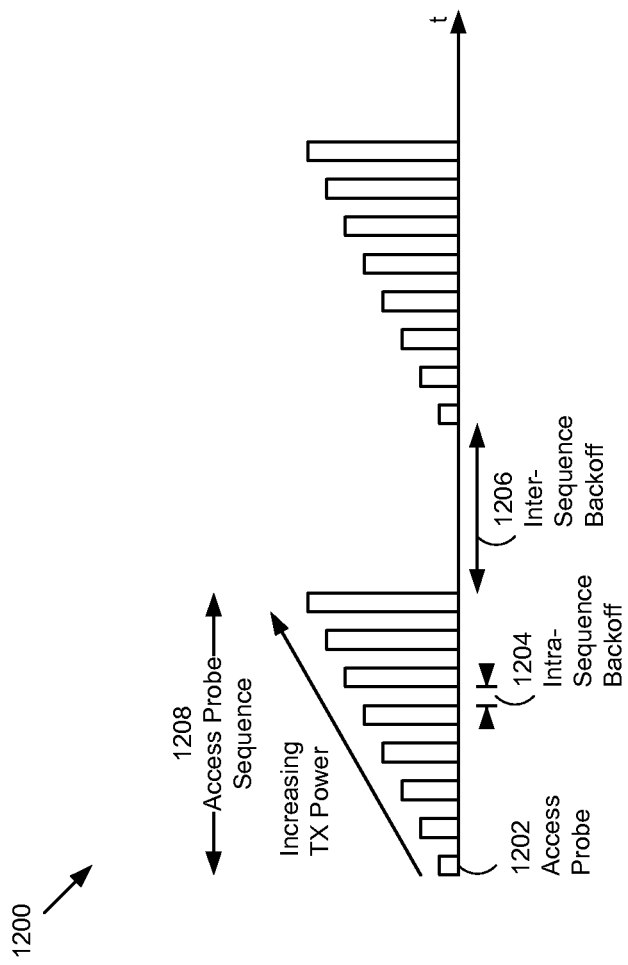
FIG. 12 illustrates a series of connection requests with increasing transmit power used to establish a connection with a wireless network.

The mobile wireless device 102 can receive a trigger to establish a connection with the wireless network 100. The trigger can originate at the mobile wireless device 102, such as when a user of the mobile wireless device 102 initiates a connection, or can originate at the wireless network 100, such as when the wireless network 100 has an incoming call or data transfer intended for the mobile wireless device 102. In response to the trigger, the mobile wireless device 102 can send a series of connection requests to the wireless network 100. As shown in FIG. 12, the mobile wireless device 102 can transmit an access probe sequence 1208 that includes a set of access probes 1202, each successive access probe 1202 having an increasing transmit power level up to a pre-determined maximum transmit power level. The mobile wireless device 102 can estimate an initial uplink transmit power level to use for the access probe sequence 1208 based on measurements of signals received in the downlink direction from the wireless network 100, as the attenuation in each transmission direction can be considered comparable. A noise and interference level at a receiver situated at the radio access subsystem 106 can be not known a priori to the mobile wireless device 102. Thus an appropriate transmit power level to achieve a given received SINR in the uplink direction at the radio access subsystem 106 in the wireless network 100 can be not known to the mobile wireless device 102. The mobile wireless device 102 can use "open loop" transmit power control to send the access probe sequence 1208 in the uplink direction to the radio access subsystem 106 of the wireless network 100. Each successive access probe 1204 within a given access probe sequence 1208 can be separated by an intra-sequence back-off time period 1204, and each successive access probe sequence 1208 can be separated by an inter-sequence back-off time period 1206. Parameters to determine the intra-sequence back-off 1208, the inter-sequence back-off 1206, the number of access probes 1204 per access probe sequence 1208 and the number of access probe sequences 1208 can be established by the wireless network 100 when the mobile wireless device 102 associates with the wireless network 100. In a representative embodiment, the access probe procedure can include two successive access probe sequences 1208 having four access probes 1202 per access probe sequence 1208.

When the mobile wireless device 102 receives no acknowledgement from the wireless network 100 to any of the access probes 1202 that use an initial radio frequency channel, the mobile wireless device 102 can conclude that the initial radio frequency channel on which the access probes 1202 were transmitted in the uplink direction can be unusable. The mobile wireless device 102 can change to using a different radio frequency channel or can change to using a different radio access technology. Reasons for why the access probes 1202 appear to be not received by the radio access subsystem 106 or for acknowledgements not to be returned to the mobile wireless device 102 can be unknown and can vary over time. For example, a temporary high level of interference can exist at the receiving radio access subsystem 106 in the wireless network 100 on the initial radio frequency channel attempted. While the number of attempts on a given radio frequency channel can be governed by parameters communicated by the wireless network 100, the mobile wireless device 102 can attempt to connect using one or more different radio frequency channels that use the same radio access technology as the initial radio frequency channel before switching to a different radio access technology. Within a radio sector 104, multiple radio frequency channels can be available as indicated by FIG. 11. In an embodiment, the mobile wireless device 102 can attempt to connect to the radio access subsystem 106 of the wireless network 100 using at least two different radio frequency channels using a preferred radio access technology and continue to attempt to establish a connection using up to a pre-determined maximum number of radio frequency channels that use the preferred radio access technology. The pre-determined maximum number of radio frequency channels can be configured by the user, by an administrator or can be set to a default value.

The mobile wireless device 102 can attempt to establish a connection with the wireless network 100 using a set of access probe sequences 1208 on a first radio frequency channel selected from a list of available radio frequency channels. The list of radio frequency channels can be determined based on one or more messages broadcast by the radio access subsystem 106 for the radio sector 104. The mobile wireless device 102 can use a selection algorithm known as "channel hashing" to select the radio frequency channel from an extracted list of radio frequency channels. The "channel hashing" algorithm can be standardized and known to the radio access subsystem 106 in the wireless network 100, and as such the wireless network 100 can know a priori on which radio frequency channel a connection request can be attempted by the mobile wireless device 102. (The wireless network 100 can perform the same "channel hashing" to determine the radio frequency channel for a particular mobile wireless device 102 as the mobile wireless device 102.) When no acknowledgement is received by the mobile wireless device 102 to the access probes 1202 using the first radio frequency channel selected, the mobile wireless device 102 can exclude the failed radio frequency channel from the list of available radio frequency channels and can perform "channel hashing" again using the reduced list of radio frequency channels that excludes the failed radio frequency channel to select a new radio frequency channel. The mobile wireless device 102 can then repeat a set of access probe sequences 1208 to attempt to connect to the wireless network 100 using a newly selected radio frequency channel.

This process of selecting a radio frequency channel from a list of radio frequency channels, transmitting access probes, excluding a failed radio frequency channel from the list and re-selecting a radio frequency channel from the modified list can repeat a pre-determined number of times. The mobile wireless device 102 can limit the number of radio frequency channels over which to attempt to establish a connection with the wireless network 100 in order to minimize the time to establish a connection. Repeated failed attempts across multiple radio frequency channels for a given preferred radio access technology can indicate that the uplink direction cannot support the given preferred radio access technology, e.g. unable to support a higher data rate connection. When unable to establish a connection using a radio frequency channel for a preferred radio access technology, the mobile wireless device 102 can switch to a less capable (e.g. lower data rate) radio access technology, as a lower data rate connection can be preferred to no connection at all.

When receiving an acknowledgement from the wireless network 100 on an alternate radio frequency channel, i.e. not on the default initial radio frequency channel, the mobile wireless device 102 can connect to the network using the alternative radio frequency channel. When a data transfer through the established connection is complete and after the mobile wireless device 102 severs the connection with the wireless network 100 and transitions from an active connected state to an idle state, the mobile wireless device 102 can return to idle on a radio frequency channel selected by the channel hashing function from a current "most complete" list of radio frequency channels available and broadcast by the radio access subsystem 106 of the wireless network 100. The previously excluded radio frequency channels can be included in the "most complete" list, as both the mobile wireless device 102 and the wireless network 100 can perform the channel hashing function using the same list of radio frequency channels. When in an idle state, the mobile wireless device 102 and the wireless network 100 can expect a future connection request to originate on the same radio frequency channel selected from a current list of radio frequency channels known to both the mobile wireless device 102 and the wireless network 100 using the same "channel hashing" function.

Figure 13:
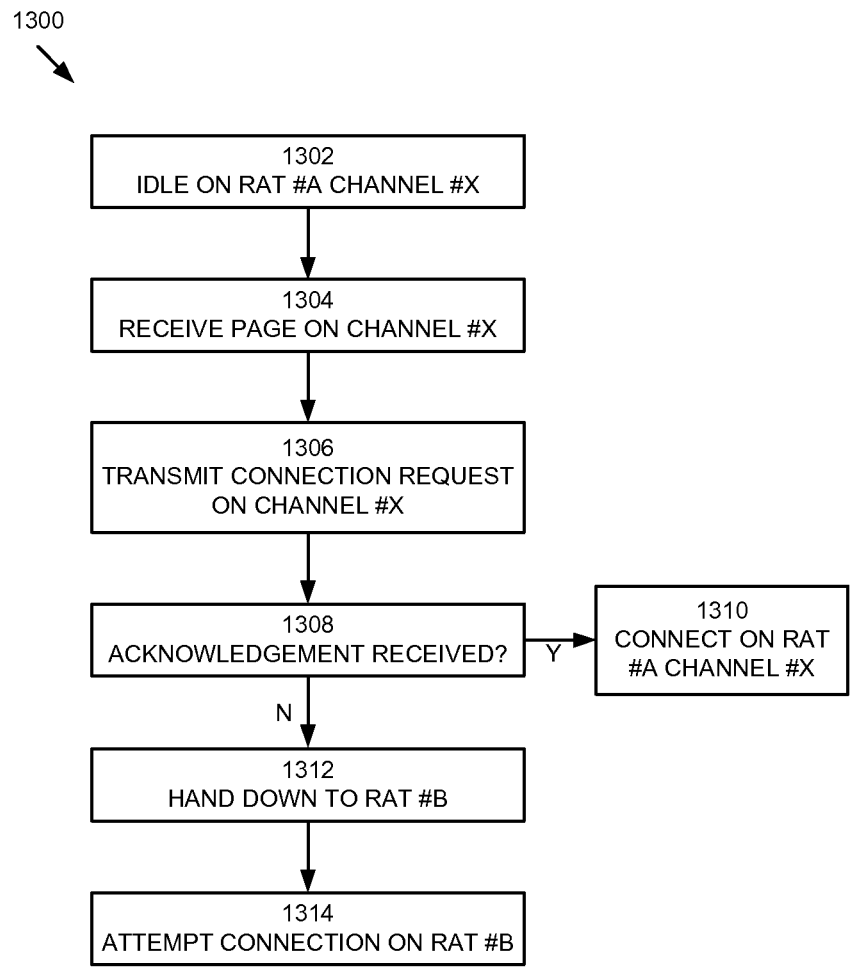
FIG. 13 illustrates a prior art method for connecting a mobile wireless device to a wireless network.

FIG. 13 outlines a prior art method for selecting a radio frequency channel when establishing a connection between the mobile wireless device 102 and the wireless network 100. In step 1302, the mobile wireless device 102 can be in an idle state on a radio frequency channel #X that uses a radio access technology #A. In step 1304, the mobile wireless device 102 can receive a page from the wireless network 100 on the radio frequency channel #X. In step 1306, in response to receiving the page from the wireless network 100, the mobile wireless device 102 can transmit a connection request to the wireless network 100 on the radio frequency channel #X. In step 1308, the mobile wireless device 102 can determine when an acknowledgement from the wireless network 100 is received in response to the transmitted connection request on channel #X. When an acknowledgement is received by the mobile wireless device 102 from the wireless network 100, the mobile wireless device 102 can connect to the wireless network 100 over the radio frequency channel #X that uses the radio access technology #A. When no acknowledgement is received from the wireless network 100 in response to the transmitted connection request on channel #X that use the radio access technology #A, the mobile wireless device 102, in step 1312, can "hand down" to a different radio access technology #B. The mobile wireless device 102 can subsequently attempt to connect to the wireless network 100 using the radio access technology #B. The transmitted connection request can be a series of connection requests as shown in FIG. 12, and the radio access technology #B can have a different set of capabilities than the radio access technology #A. The "hand down" to the radio access technology #B can be performed quickly in order to establish a connection to the wireless network 100 with minimal delay for the use of the mobile wireless device 102; however, the resulting connection can have a less preferred set of capabilities than a connection to the wireless network 100 that can use the initial preferred radio access technology #A.

Figure 14:
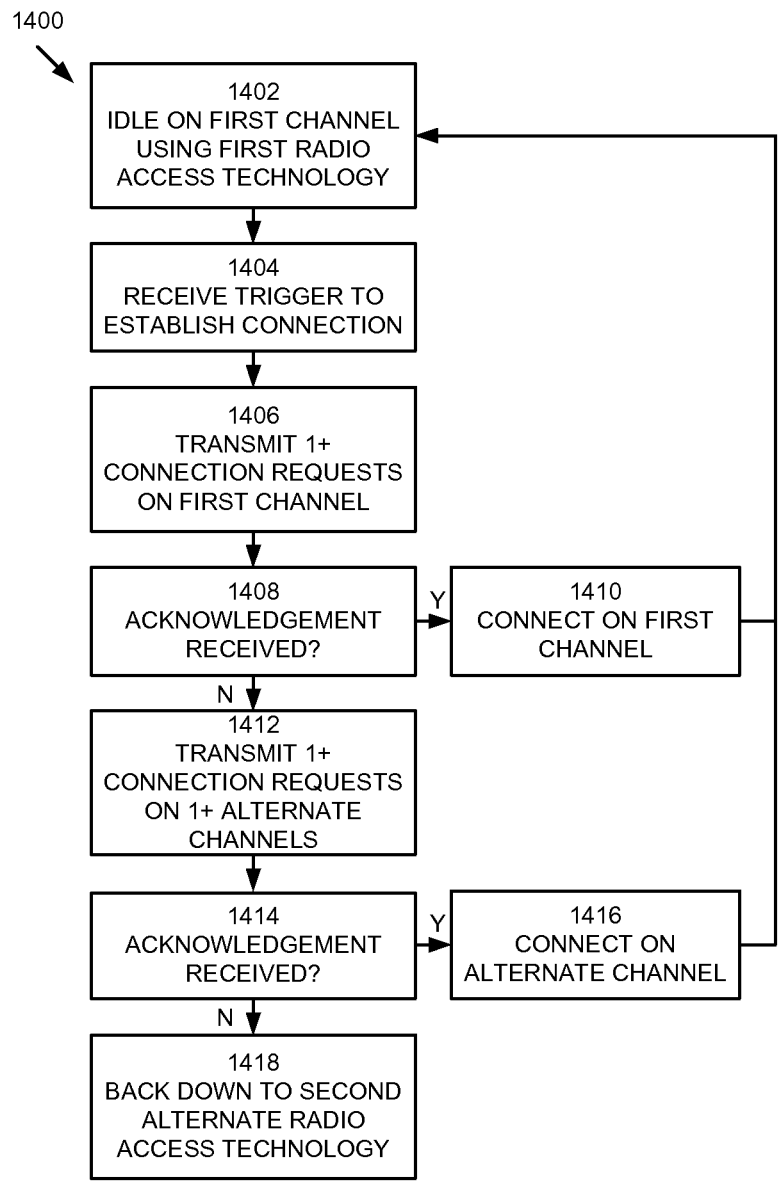
FIG. 14 illustrates a representative method to select a channel adaptively for connecting the mobile wireless device to a wireless network.

FIG. 14 illustrates a representative method for selecting a radio frequency channel adaptively when establishing a connection between the mobile wireless device 102 and the wireless network 100. In step 1402, the mobile wireless device 102 can be associated with the wireless network 100 in an idle state on a first radio frequency channel that uses a first radio access technology. The "first" radio frequency channel refers to a particular radio frequency channel that uses the first radio access technology and not necessarily to the first radio frequency channel in an ordered list of radio frequency channels that the mobile wireless device 102 can maintain. Similarly the "first" radio access technology refers to a particular radio access technology and not necessarily to a position of the first radio access technology in an ordered list of radio access technologies that the mobile wireless device 102 can maintain. In an embodiment, the first radio frequency channel can have been selected by the mobile wireless device 102 from a list of radio frequency channels using a hashing algorithm. In step 1404, the mobile wireless device 102 can receive a trigger to establish a connection with the wireless network 100. The trigger can originate at the mobile wireless device 102, such as when a user of the mobile wireless device 102 initiates a connection with the wireless network 100. The trigger can also originate at the wireless network 100, such as when a message is received by the mobile wireless device 102 indicating data exists to transfer from the wireless network 100 to the mobile wireless device 102. In response to the received trigger, the mobile wireless device 102 can transmit one or more connection requests on the first radio frequency channel that uses the first radio access technology. The one or more connection requests can include a series of access probes 1202 in one or more access probe sequences 1208 as shown in FIG. 12. The number of access probes 1202 and access probe sequences 1208 can be determined by the wireless network 100.

When an acknowledgement is received by the mobile wireless device 102 from the wireless network 100 in response to the connection request, the mobile wireless device 102 can connect to the wireless network 100 on the first radio frequency channel in step 1410. When data transfer is complete, the mobile wireless device 102 and/or the wireless network 100 can release the connection on the first radio frequency channel, and the mobile wireless device 102 can return to the idle state by re-associating with the wireless network 100 on a radio frequency channel that uses the first radio access technology in step 1402. In an embodiment, the radio frequency channel with which the mobile wireless device 102 re-associates with the wireless network 100 is the first radio frequency channel with which the mobile wireless device 102 was associated with the wireless network 100 previously.

When no acknowledgement is received by the mobile wireless device 102 in response to the one or more connection requests on the first radio frequency channel, in step 1412, the mobile wireless device 102 can transmit one or more connection requests on one or more alternate radio frequency channels that use the first radio access technology. The alternate radio frequency channels will use different radio frequency carriers than the first radio frequency channel attempted but the same first radio access technology. The mobile wireless device 102 can attempt to establish a connection with the wireless network 100 using the first radio access technology by sending connection requests on each of the one or more alternate radio frequency channels until an acknowledgement is received or until a predetermined maximum number of alternate radio frequency channels that use the first radio access technology have been tried. The connection requests can be sent as a series of access probes 1202 in one or more access probe sequences 1208 as determined by the wireless network 100. When an acknowledgement is received from the wireless network 100 on an alternate radio frequency channel that uses the first radio access technology, the mobile wireless device 102 can connect to the wireless network 100 using the alternate radio frequency channel in step 1416. When data transfer over the connection that uses the alternate radio frequency channel is complete, the mobile wireless device 102 and/or the wireless network 100 can terminate the connection on the alternate radio frequency channel, and the mobile wireless device 102 can return to associating with the wireless network 100 in the idle state on the first radio frequency channel in step 1402. When no acknowledgement is received to the one or more connection requests using the one or more alternate radio frequency channels that use the first radio access technology, the mobile wireless device 102 in step 1418 can "hand down" to use a second alternate radio access technology in order to attempt a connection with the wireless network 100.

Figure 15:
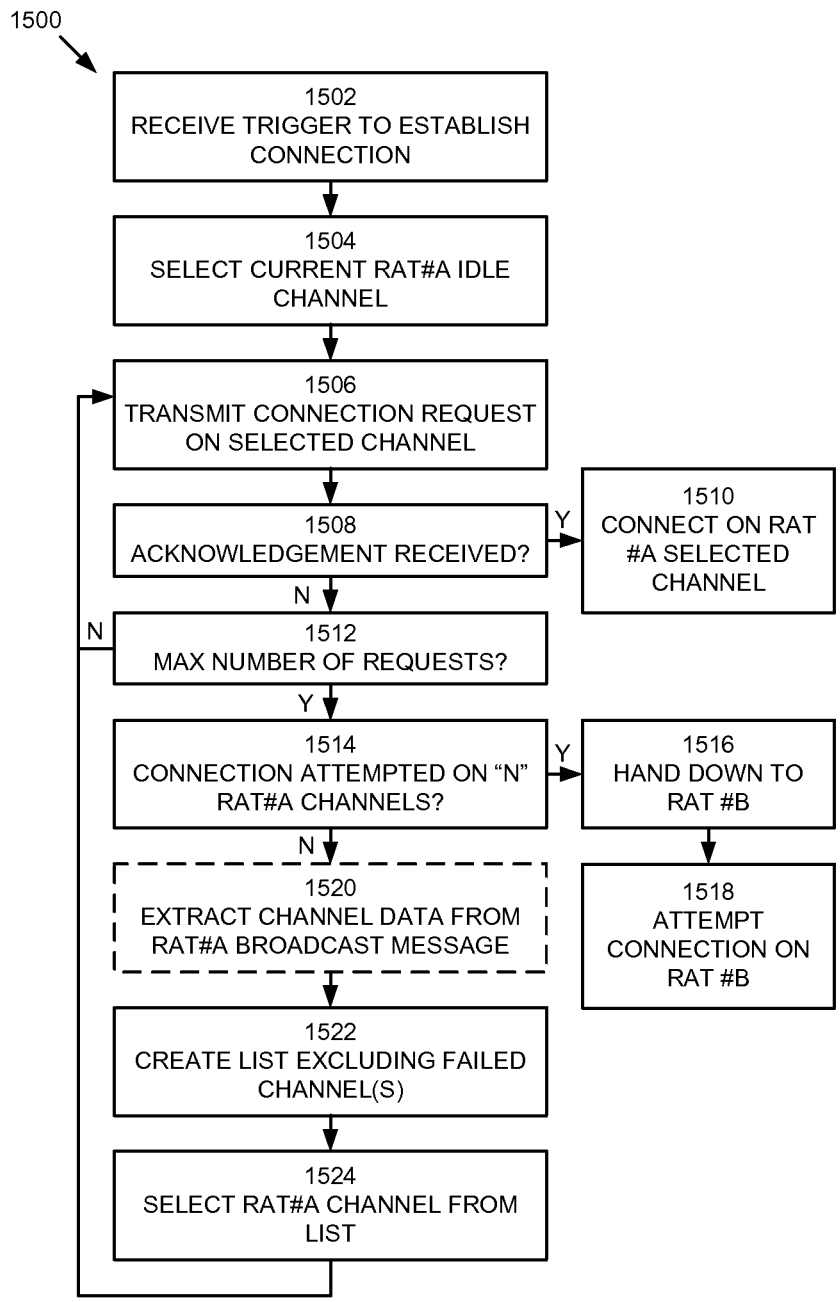
FIG. 15 illustrates another representative method to select a channel adaptively for connecting the mobile wireless device to a wireless network.

FIG. 15 illustrates another representative method to adapt channel selection when establishing a connection between the mobile wireless device 102 and the wireless network 100. In step 1502, the mobile wireless device 102 can receive a trigger to establish a connection with the wireless network 100. As described for FIG. 14, the trigger can originate at the mobile wireless device 102 or within the wireless network 100. In response to the received trigger, the mobile wireless device 102, in step 1504, can select a radio frequency channel that uses radio access technology #A, the radio frequency channel being a channel on which the mobile wireless device 102 is associated with the wireless network 100 in an idle state. This radio frequency channel can have been previously determined by the mobile wireless device 102 using a channel hashing algorithm that selects a radio frequency channel from a list of radio frequency channels. The list of radio frequency channels for radio access technology #A can be broadcast periodically by the wireless network 100. In step 1506, the mobile wireless device 102 can transmit a connection request to the wireless network 100 using the selected radio frequency channel that uses radio access technology #A. In step 1508, the mobile wireless device 102 can determine if an acknowledgement to the connection request is received from the wireless network 100. When an acknowledgement is received, in step 1510, the mobile wireless device 102 can connect to the wireless network 100 using the selected radio frequency channel that uses radio access technology #A. When no acknowledgement is received by the mobile wireless device 102 from the wireless network 100, the mobile wireless device 102, in step 1512, can determine whether a maximum number of connection requests have been transmitted using the selected radio frequency channel that uses radio access technology #A. Until the maximum number of connection requests have been transmitted by the mobile wireless device 102 or until an acknowledgement is received by the mobile wireless device 102 from the wireless network 100, the mobile wireless device 102 can repeat transmission of the connection request to the wireless network 100 using the selected radio frequency channel that uses radio access technology #A. In an embodiment, the maximum number of transmitted connection requests for a given radio frequency channel can be determined by parameters communicated from the wireless network 100.

After reaching the maximum number of connection requests using the selected radio frequency channel, the mobile wireless device 102, in step 1514, can determine if "N" different radio frequency channels that use the radio access technology #A have been used to attempt to establish a connection with the wireless network 100. The number "N" of different radio frequency channels to attempt can be predetermined by a default configuration or can be determined by the mobile wireless device 102. In an embodiment, the mobile wireless device 102 can determine the number "N" based on a configuration set by the user or by an administrator of the mobile wireless device 102. In an embodiment, the number "N" can be determined based on at least on a quality of service property for the radio access technology on which connection attempts are made. After trying a maximum number of connection requests with a currently selected radio frequency channel that uses radio access technology #A, the mobile wireless device 102 can select an alternate radio frequency channel from a list of radio frequency channels that excludes previously failed radio frequency channels. In an embodiment, the mobile wireless device 102 can select the alternate radio frequency channel using the same hashing algorithm as used previously, except applied to a different (typically shorter) list of radio frequency channels. The different list of radio frequency channels can be created by the mobile wireless device from a previous list of radio frequency channels or from a newly created list of radio frequency channels. In an embodiment, in an optional step 1520, the mobile wireless device 102 can extract channel data from a message broadcast by the wireless network 100 for radio access technology #A. The wireless network 100 can periodically transmit a complete radio frequency channel list for each radio access technology. In step 1522, the mobile wireless device 102 can create a new list of radio frequency channels available that use radio access technology #A and can exclude from the new list any "failed" radio frequency channels that have been attempted previously. In another embodiment, the list of radio frequency channels can be created from a previously created list of radio frequency channels by excluding the most recent radio frequency channel on which connection attempts have been made and failed.

In step 1524, the mobile wireless device 102 can select a new radio frequency channel from the created list that excludes failed radio frequency channels, and the mobile wireless device 102 can "camp" on the newly selected radio frequency channel that uses radio access technology #A. The mobile wireless device 102 can then transmit one or more connection requests to establish a connection with the wireless network 100 using the newly selected radio frequency channel. In an embodiment, the mobile wireless device 102 can select the radio frequency channel from the created list of radio frequency channels using the same hashing algorithm as used previously, except that the hashing algorithm can be applied to the smaller list of radio frequency channels that excludes previously failed radio frequency channels. The list of radio frequency channels from which to select a radio frequency channel can become progressively smaller as additional failed radio frequency channels can be excluded during each subsequent series of attempts to establish a connection to the wireless network 100.

In an embodiment, the mobile wireless device 102 can attempt to establish a connection using each radio frequency channel that uses radio access technology #A up to a maximum number of attempts (i.e. the maximum number of times that the mobile wireless device 102 can cycle through steps 1506/1508/1512 for a given radio frequency channel can be the same for all radio frequency channels attempted that use the same radio access technology). In another embodiment, the mobile wireless device 102 can attempt to connect to the wireless network 100 over a succession of radio frequency channels using fewer connection attempts for each successive radio frequency channel (i.e. the maximum number of times that the mobile wireless device 102 cycles through steps 1506/1508/1512 for a given radio frequency channel can decrease for each successive radio frequency channel attempted). When no acknowledgement is received by the mobile wireless device 102 from the wireless network 100 to any of the connection requests over any of "N" different radio frequency channels that use radio access technology #A, the mobile wireless device 102, in step 1516, can "hand down" to radio access technology #B. The mobile wireless device 102 can then attempt to connect to the wireless network 100 by transmitting on radio frequency channels that use radio access technology #B in step 1518.

By attempting to connect to the wireless network 100 using more than one radio frequency channel that each use the same radio access technology #A, which can be a preferred radio access technology, the mobile wireless device 102 can increase the probability of establishing a connection having a preferred set of properties, such as a higher data rate connection. The maximum number "N" of different radio frequency channels with which to attempt to establish a connection can be preconfigured or can be set by a user or by another entity, such as a network administrator. The maximum number "N" of different radio frequency channels can be selected to limit time spent attempting to connect using a more preferred radio access technology before "backing down" to a less preferred radio access technology. The maximum number "N" can be selected directly, such as by a default configuration, or can be set indirectly, such as through a user setting that offers a choice between faster data rate connections or faster connection times.

Figure 16:
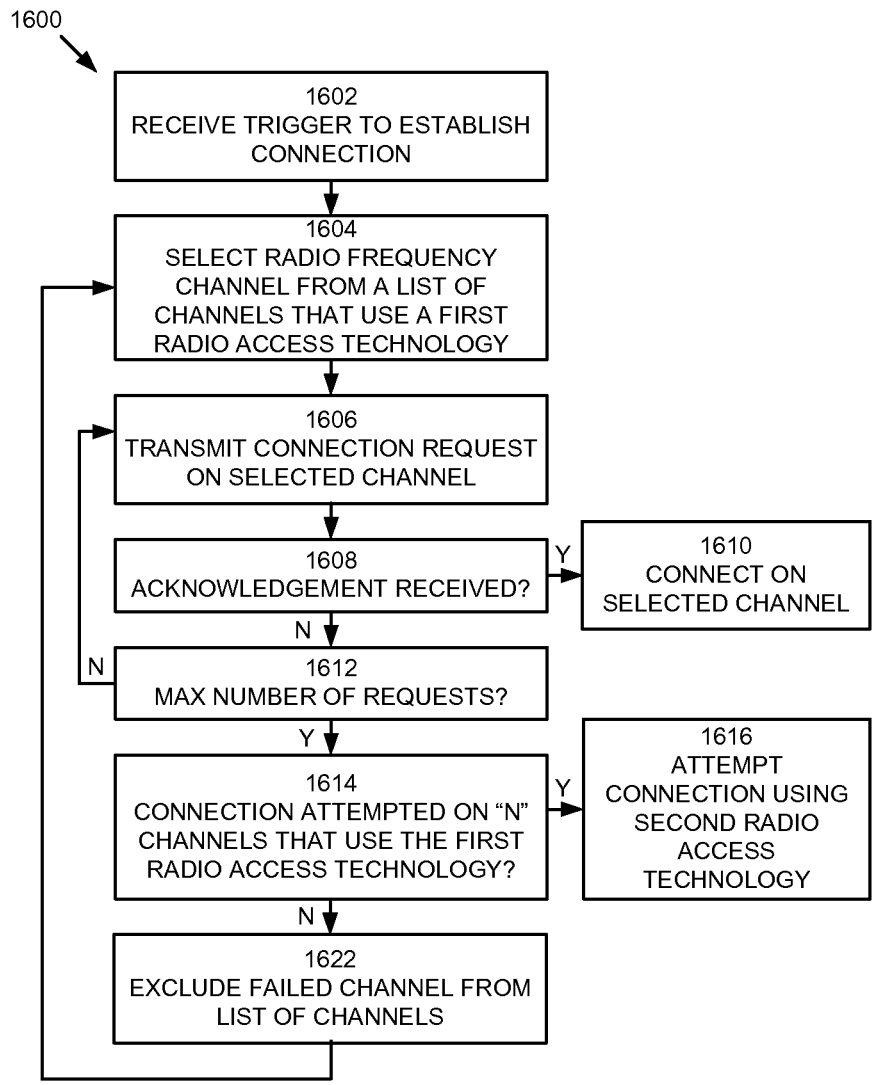
FIG. 16 illustrates a further representative method to select a channel adaptively for connecting the mobile wireless device to a wireless network.

FIG. 16 illustrates a further representative method to select one or more radio frequency channels adaptively to establish a connection between the mobile wireless device 102 and the wireless network 100. In step 1602, the mobile wireless device 102 can receive a trigger to establish a connection. In step 1604, the mobile wireless device 102 can select a radio frequency channel from a list of radio frequency channels, where each radio frequency channel can use a first radio access technology. In step 1606, the mobile wireless device 102 can transmit a connection request on the selected radio frequency channel to the wireless network 100. The connection request can be retransmitted up to a set maximum number of connection request attempts. When an acknowledgement from the wireless network 100 is received by the mobile wireless device 102 to a connection request, the mobile wireless device 102 can connect to the wireless network 100 using the selected radio frequency channel in step 1610. In step 1614, the mobile wireless device 102 can determine if connection requests have been attempted on "N" different radio frequency channels that use the first radio access technology. The number "N" can be pre-determined and/or can be configurable. In step 1622, the mobile wireless device 102 can exclude failed radio frequency channels on which a maximum number of connection requests have been attempted from the list of radio frequency channels. The mobile wireless device 102 can then return to step 1604 to select another radio frequency channel from the updated list of radio frequency channels that excludes the failed radio frequency channels. The mobile wireless device 102 can repeat one or more connection requests using the newly selected radio frequency channel. When the mobile wireless device 102 determines in step 1614 that "N" different radio frequency channels that use the first radio access technology have been attempted to establish a connection with the wireless network 100, and all of the attempts have been unsuccessful, the mobile wireless device 102, in step 1616, can attempt to connect to the wireless network 100 by transmitting on radio frequency channels that use a second radio access technology.

The representative methods described above can be extended to more than two different radio access technologies. In a representative embodiment, the mobile wireless device 102 can maintain an ordered list of preferred radio access technologies and/or preferred revisions of radio access technology protocols in order to determine an order in which to attempt a connection with the wireless network 100. The number of transmitted connection requests for each radio frequency channel attempted can vary with different radio access technologies, and the maximum number of radio frequency channels to attempt for each radio access technology can also vary. The mobile wireless device 102 can include capabilities to transmit using two or more different radio access technologies, such as GSM, UMTS, 1xRTT, 1xEV-DO, LTE, LTE-Advanced, etc. Each of these radio access technologies can also include multiple revisions that offer different capabilities for the user of the mobile wireless device 102. The mobile wireless device 102 can include a default configuration in hardware, firmware or software that can bias a preference for connections that have one or more specific features. In a representative embodiment, the mobile wireless device 102 can be configured to prefer connections with a combination or one or more features including (1) a higher nominal data rate (bits per second), (2) a more power efficient data transfer (minimum power consumed per bit) and (3) a higher measured actual data transfer rate.

Various aspects of the described embodiments can be implemented by software, hardware or a combination of hardware and software. The described embodiments can also be encoded as computer program code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of adapting radio frequency channel selection to connect a mobile wireless device with a wireless network, the method comprising:
   at the mobile wireless device:
   when associated with the wireless network on a first radio frequency channel that uses a first radio access technology, receiving a trigger to establish a connection between the mobile wireless device and the wireless network, and transmitting one or more connection requests to the wireless network on the first radio frequency channel;
   when receiving an acknowledgement from the wireless network to the one or more connection requests transmitted on the first radio frequency channel, connecting to the wireless network on the first radio frequency channel;

when receiving no acknowledgement from the wireless network to the one or more connection requests transmitted on the first radio frequency channel, transmitting one or more connection requests to the wireless network on a second radio frequency channel that uses the first radio access technology;

when receiving an acknowledgement from the wireless network to the one or more connection requests transmitted on the second radio frequency channel, connecting to the wireless network on the second radio frequency channel;

when receiving no acknowledgement from the wireless network to the one or more connection requests transmitted on the first and second radio frequency channels that use the first radio access technology, attempting to connect to the wireless network using a second radio access technology;

when receiving an acknowledgement from the wireless network to a connection request transmitted on a third radio frequency channel that uses the second radio access technology, connecting to the wireless network on the third radio frequency channel; and after receiving a connection release from the wireless network, associating with the wireless network on a radio frequency channel that uses the first radio access technology.

2. A method of adapting radio frequency channel selection to connect a mobile wireless device with a wireless network, the method comprising:

at the mobile wireless device:

when associated with the wireless network on a first radio frequency channel that uses a first radio access technology, receiving a trigger to establish a connection between the mobile wireless device and the wireless network, and transmitting one or more connection requests to the wireless network on the first radio frequency channel;

when receiving an acknowledgement from the wireless network to the one or more connection requests transmitted on the first radio frequency channel, connecting to the wireless network on the first radio frequency channel;

when receiving no acknowledgement from the wireless network to the one or more connection requests transmitted on the first radio frequency channel, transmitting one or more connection requests to the wireless network on a second radio frequency channel that uses the first radio access technology;

when receiving an acknowledgement from the wireless network to the one or more connection requests transmitted on the second radio frequency channel, connecting to the wireless network on the second radio frequency channel;

when receiving no acknowledgement from the wireless network to the one or more connection requests transmitted on the first and second radio frequency channels that use the first radio access technology, attempting to connect to the wireless network using a second radio access technology;

wherein a maximum number of connection requests transmitted to the wireless network on radio frequency channels that use the first radio access technology before switching to the second radio access technology is based on one or more quality of service properties available for connections that use the first and second radio access technologies.

3. The method as recited in claim 1, further comprising:
at the mobile wireless device:
selecting the first radio frequency channel from a first list of radio frequency channels that use the first radio access technology; and
selecting the second radio frequency channel from a second list of radio frequency channels that use the first radio access technology, wherein the second list excludes the first radio frequency channel.

4. The method as recited in claim 1, further comprising:
at the mobile wireless device:
maintaining an ordered list of radio access technologies based on preferred properties for connections by the mobile wireless device; and
when failing to connect to the wireless network using the first radio access technology, selecting the second radio access technology in preferential order from the ordered list of radio access technologies.

5. The method as recited in claim 1, wherein the first radio access technology uses a more recent generation wireless communication protocol than the second radio access technology.

6. The method as recited in claim 1, wherein the first radio access technology supports connections having higher transmission rates than the second radio access technology.

7. A method of adapting radio frequency channel selection to connect a mobile wireless device with a wireless network, the method comprising:
at the mobile wireless device:
receiving a trigger to establish a connection with the wireless network;
selecting a radio frequency channel from a list of radio frequency channels that use a first radio access technology;
transmitting to the wireless network a series of connection requests on the selected radio frequency channel using the first radio access technology;
when receiving no acknowledgement to the series of connection requests on the selected radio frequency channel, excluding the selected radio frequency channel from the list of radio frequency channels and repeating the selecting, transmitting and excluding up to a maximum number of repetitions;
when receiving no acknowledgement to connection requests transmitted on any of the selected radio frequency channels that use the first radio access technology, attempting to connect to the wireless network by transmitting on one or more radio frequency channels that use a second radio access technology;
connecting to the wireless network on a third radio frequency channel that uses the second radio access technology after receiving an acknowledgement from the wireless network to a connection request transmitted on the third radio frequency channel; and
associating the mobile wireless device with the wireless network on a radio frequency channel that uses the first radio access technology after receiving a connection release from the wireless network for the connection on the third radio frequency channel.

8. The method as recited in claim 7, further comprising:
at the mobile wireless device:
maintaining an ordered list of radio access technologies; and
selecting the second radio access technology from the ordered list of radio access technologies in preferential order.

9. The method as recited in claim 8, wherein the ordered list of radio access technologies includes multiple generations of radio access technologies with later generations having a higher preferential order.

10. The method as recited in claim 7, wherein a maximum number of connection requests on each selected radio frequency channel is determined by parameters communicated from the wireless network.

11. The method as recited in claim 10, wherein a maximum number of connection requests that use a particular radio access technology is determined by the mobile wireless device.

12. A method of adapting radio frequency channel selection to connect a mobile wireless device with a wireless network, the method comprising:
at the mobile wireless device:
receiving a trigger to establish a connection with the wireless network;
selecting a radio frequency channel from a list of radio frequency channels that use a first radio access technology;
transmitting a series of connection requests on the selected radio frequency channel using the first radio access technology to the wireless network;
when receiving no acknowledgement to the series of connection requests on the selected radio frequency channel, excluding the selected radio frequency channel from the list of radio frequency channels and repeating the selecting, transmitting and excluding up to a maximum number of repetitions; and
when receiving no acknowledgement to connection requests transmitted on any of the selected radio frequency channels that use the first radio access technology, attempting to connect to the wireless network by transmitting on one or more radio frequency channels that use a second radio access technology;
wherein the maximum number of repetitions of the selecting, transmitting and excluding steps for the radio frequency channels that use the first radio access technology is based on at least one quality of service property of the first radio access technology.

13. A mobile wireless device comprising:
a application processor configured to control establishing and releasing connections for application services; and
a transceiver configured to transmit signals to and receive signals from a wireless network;
wherein the transceiver is further configured to:
transmit up to a maximum number of connection requests to the wireless network on a first radio frequency channel that uses a first radio access technology;
transmit one or more connection requests on one or more alternate radio frequency channels that use the first radio access technology, when receiving no acknowledgement from the wireless network to any of the connection requests transmitted on the first radio frequency channel;
transmit one or more connection requests using a second radio access technology, when receiving no acknowledgement from the wireless network to any of the connection requests transmitted on the first radio frequency channel or on the one or more alternate radio frequency channels that use the first radio access technology; and
establish a connection to the wireless network using the second radio access technology after receiving an acknowledgement from the wireless network to one of the connection requests that uses the second radio access technology; and
re-associate with the wireless network on a radio frequency channel that uses the first radio access technology after receiving a connection release from the wireless network for the connection that uses the second radio access technology.

14. The mobile wireless device as recited in claim 13, wherein the number of alternate radio frequency channels that use the first radio access technology on which connection requests are transmitted before switching to the second radio access technology is based on a configurable setting in the mobile wireless device.

15. The mobile wireless device as recited in claim 13, wherein the processor is further configured to:
maintain a list of radio access technologies preferentially ordered based on properties for connections by the mobile wireless device; and
select the second radio access technology from the list of radio access technologies in preferential order, when failing to connect to the wireless network using the first radio access technology.

16. The mobile wireless device as recited in claim 13, wherein the processor is further configured to:
create a list of radio frequency channels that use the first radio access technology based on one or more broadcast messages received from the wireless network;
select the first radio frequency channel on which to transmit the connection requests from the created list of radio frequency channels;
create a shorter list of radio frequency channels that use the first radio access technology excluding any radio frequency channels on which transmitted connection requests have previously failed to establish a connection; and
select each alternate radio frequency channel in turn from a progressively shorter created list of radio frequency channels.

17. Computer program product encoded in a non-transitory computer readable medium for adapting radio frequency channel selection to connect a mobile wireless device with a wireless network, the computer program product comprising:
computer program code for creating a list of radio frequency channels that use a first radio access technology;
computer program code for selecting a radio frequency channel from the created list of radio frequency channels that use the first radio access technology;
computer program code for transmitting a series of connection requests on the selected radio frequency channel to the wireless network;
computer program code for repeating the creating, selecting and transmitting until receiving an acknowledgement from the wireless network or until transmitting on a maximum number of different radio frequency channels that use the first radio access technology, wherein each successively created list of radio frequency channels excludes previously selected radio frequency channels that use the first radio access technology;
computer program code for transmitting connection requests to the wireless network on radio frequency channels that use a second radio access technology, when receiving no acknowledgement to connection requests on any of the selected radio frequency channels that use the first radio access technology; and
computer program code for re-associating the mobile wireless device with the wireless network on a radio frequency channel that uses the first radio access technology after receiving a connection release from the wireless network for a connection formed using the first or second radio access technologies.

18. The computer program product as recited in claim 17, wherein the first radio access technology uses a more recent generation wireless communication protocol than the second radio access technology.

19. The computer program product as recited in claim 17, further comprising:
   computer program code for maintaining an ordered list of radio access technologies; and
   computer program code for selecting the second radio access technology from the ordered list of radio access technologies in preferential order.

20. Computer program product encoded in a non-transitory computer readable medium for adapting radio frequency channel selection to connect a mobile wireless device with a wireless network, the computer program product comprising:
   computer program code for creating a list of radio frequency channels that use a first radio access technology;
   computer program code for selecting a radio frequency channel from the created list of radio frequency channels that use the first radio access technology;
   computer program code for transmitting a series of connection requests on the selected radio frequency channel to the wireless network;
   computer program code for repeating the creating, selecting and transmitting until receiving an acknowledgement from the wireless network or after transmitting on a set maximum number of different radio frequency channels that use the first radio access technology, wherein each successively created list of radio frequency channels excludes previously selected radio frequency channels that use the first radio access technology; and
   computer program code for setting the maximum number of different radio frequency channels that use the first radio access technology based on a type of connection being established by the transmitted connection requests that use the first radio access technology.

* * * * *

UNITED STATES PATENT AND TRADEMARK OFFICE
CERTIFICATE OF CORRECTION

| | | |
|---|---|---|
| PATENT NO. | : 8,743,809 B2 | Page 1 of 1 |
| APPLICATION NO. | : 13/348323 | |
| DATED | : June 3, 2014 | |
| INVENTOR(S) | : Prashant H. Vashi et al. | |

It is certified that error appears in the above-identified patent and that said Letters Patent is hereby corrected as shown below:

In the Claims

Column 25, line 43, delete the word "application".

Signed and Sealed this
Twenty-ninth Day of July, 2014

Michelle K. Lee
*Deputy Director of the United States Patent and Trademark Office*